(12) United States Patent
Liu et al.

(10) Patent No.: US 10,903,919 B2
(45) Date of Patent: Jan. 26, 2021

(54) MASSIVE MIMO AAS SUPERVISION

(71) Applicant: Telefonaktiebolaget LM Ericsson (publ), Stockholm (SE)

(72) Inventors: Ping Liu, Ottawa (CA); Edwin Vai Hou Iun, Ottawa (CA); Dongsheng Yu, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/757,518

(22) PCT Filed: Nov. 7, 2017

(86) PCT No.: PCT/IB2017/056968
§ 371 (c)(1),
(2) Date: Apr. 20, 2020

(87) PCT Pub. No.: WO2019/092476
PCT Pub. Date: May 16, 2019

(65) Prior Publication Data
US 2020/0252143 A1 Aug. 6, 2020

(51) Int. Cl.
*H04B 17/318* (2015.01)
*H04B 7/0413* (2017.01)
(Continued)

(52) U.S. Cl.
CPC ......... *H04B 17/318* (2015.01); *H04B 7/0413* (2013.01); *H04W 24/02* (2013.01); *H04W 24/04* (2013.01)

(58) Field of Classification Search
CPC ...... H04B 17/318; H04B 7/0413; H04B 7/00; H04B 7/0617; H04W 24/02; H04W 24/04; H04W 24/00
See application file for complete search history.

(56) References Cited

U.S. PATENT DOCUMENTS 8,184,050 B2    5/2012 Le Sage et al.
8,254,848 B1    8/2012 Elliott et al.
(Continued)

FOREIGN PATENT DOCUMENTS

| EP | 2824850 A1 | 1/2015 |
| WO | 2014183802 A1 | 11/2014 |
| WO | 2017068356 A2 | 4/2017 |

OTHER PUBLICATIONS

Author Unknown, "Nokia, Du Use Telco Drones for Network Planning," Light Reading, News Wire Feed, Dubai, Jul. 7, 2015, URL: "https://www.lightreading.com/drones/nokia-du-use-telco-drones-for-network-planning/d/d-d/716823?itc=Irnewsletter_Irdaily," retrieved Jan. 29, 2020, 2 pages.

(Continued)

*Primary Examiner* — Vineeta S Panwalkar
(74) *Attorney, Agent, or Firm* — Withrow & Terranova, PLLC

(57) ABSTRACT

Systems and methods related to monitoring a status, or health, of a (e.g., massive) Multiple Input Multiple Output (MIMO) transceiver and, in particular, that of an antenna system (e.g., an Advanced Antenna System (AAS)) of the MIMO transceiver are disclosed. In some embodiments, a method of operation of a radio system implemented in a radio access node to perform supervision of a MIMO transceiver of the radio system comprises performing continuous over-the-air based supervision the MIMO transceiver of the radio system, determining a status of the MIMO transceiver based on results of performing continuous over-the-air based supervision of the MIMO transceiver of the radio system, and taking an action based on the status of the MIMO transceiver.

20 Claims, 18 Drawing Sheets

(51) Int. Cl.
 H04W 24/02 (2009.01)
 H04W 24/04 (2009.01)

(56) References Cited

U.S. PATENT DOCUMENTS

| | | |
|---|---|---|
| 2003/0076257 A1 | 4/2003 | Padros |
| 2009/0061941 A1 | 3/2009 | Clark |
| 2012/0026998 A1* | 2/2012 | O'Keeffe ............... H04B 7/086 370/338 |
| 2012/0040629 A1* | 2/2012 | Li ....................... H04B 7/0617 455/91 |
| 2013/0322562 A1 | 12/2013 | Zhang et al. |

OTHER PUBLICATIONS

Invitation to Pay Additional Fees and Partial Search for International Patent Application No. PCT/IB2017/056968, dated Jul. 24, 2018, 21 pages.

International Search Report and Written Opinion for International Patent Application No. PCT/IB2017/056968, dated Sep. 18, 2018, 27 pages.

\* cited by examiner

MASSIVE MIMO AAS SUPERVISION

This application is a 35 U.S.C. § 371 national phase filing of International Application No. PCT/IB2017/056968, filed Nov. 7, 2017, the disclosure of which is incorporated herein by reference in its entirety.

TECHNICAL FIELD

The present disclosure relates to a massive Multiple Input Multiple Output (MIMO) Advanced Antenna System (AAS) and, in particular, relates to supervision or monitoring of a massive MIMO AAS.

BACKGROUND

A massive Multiple Input Multiple Output (MIMO) Advanced Antenna System (AAS) radio system (i.e., a radio system implementing a massive MIMO AAS) differs from a current radio system in that it uses a very large number of antennas (e.g., tens, hundreds, or thousands of antennas) that are operated fully coherently and adaptively. Most of today's radio systems use two, four, or eight antennas. Deploying many antennas coherently in a massive MIMO AAS radio system is an essential element of Fifth Generation (5G) technology for the commercial mobile network.

Existing advanced antenna radio system architectures have a limitation when attempting to scale them for a massive MIMO AAS radio system. Considering an example in which the radio system is a Base Transceiver Station (BTS), as shown in FIG. 1, the number of cables interconnecting the BTS, the tower mounted amplifiers, and the antennas must increase exponentially when going from a few antennas to many antennas. Similarly, if the radio system is a Remote Radio Head (RRH), the number of cables interconnecting the RRH and the antennas must increase exponentially when going from a few antennas to many antennas, as also shown in FIG. 1. The number of cables needed for massive MIMO AAS when using conventional architectures becomes impractical. As also illustrated in FIG. 1, one solution is to integrate subsystems together. This integration comes but at the cost of disappearing test points. In other words, when integrating subsystems together, testing and fault isolation become challenging.

Difficulty in testing and fault isolation becomes particularly problematic for a massive MIMO AAS radio system. In particular, one important aspect of a massive MIMO AAS radio system is the ability to provide accurate, narrow beamforming. To provide this beamforming, both the amplitude and phase of each antenna element are controlled. Controlling both amplitude and phase enables adjustment of side lobe levels and steering of nulls better than that which can be done by controlling only phase.

With respect to beamforming, FIG. 2 illustrates one example of a massive MIMO AAS radio system that utilizes beamforming. Here, general beamforming system (including both digital beamforming and analog beamforming) is implemented using a digital precoder in the digital domain for controlling both amplitude and phase and the phase shifters in analog domain for additional phase control. If there are only a few outputs (e.g., two Inverse Fourier Transform (IFFT)-Parallel to Serial (P/S) converter-Digital to Analog Converter (DAC) chains) from the digital precoder and a large number of antenna elements (e.g., 128) controlled by phase shifters in the analog transmitter, the beamforming is usually referred to as analog beamforming. The main benefit of analog beamforming is that it is a low-cost beamforming solution as compared to digital beamforming. If there are a large number of outputs from the digital precoder (e.g., 64 IFFT-P/S-DAC chains) and a few antenna elements controlled by phase shifters, the beamforming is usually referred to as digital beamforming. The benefit of digital beamforming is that digital beamforming provides more flexibility in frequency domain resource utilization and improved overall system performance.

In digital beamforming, the operations of phase shifting and amplitude scaling for each antenna element, and summation for receiving, are done digitally. Either general-purpose Digital Signal Processors (DSPs) or dedicated beamforming chips are used. This is a more complicated and expensive system with the benefit of improved performance.

The number of connectors corresponds to the number of physical antenna ports for digital beamforming as required by the mobile system specification. In Third Generation Partnership Project (3GPP) Long Term Evolution (LTE) specification Release (Rel-) 8 to Rel-12, up to eight physical antenna ports are specified, as illustrated on the left-hand side of FIG. 3. In Rel-13/14, sixteen to thirty-two physical antenna ports are defined for Full Dimension MIMO (FD-MIMO). An example for Rel-13 is illustrated on the right-hand side of FIG. 3. A higher number of physical antennas provides more spatial multiplexing capacity (i.e., more layers) and improved beamforming gain. In practice, there is also the trend to deploy more physical antennas (e.g. 64, 128 antenna ports) than specified in the standard to provide additional benefits of beamforming. In such a case, antenna virtualization is usually applied. With legacy base station radio hardware with the capability of beamforming of a few antennas, antenna system testing is usually carried out manually by connecting a measurement device and the radio unit through cables, one per antenna. It is done in the lab before deployment or maintained in the field following a fault alarm. For the massive MIMO AAS system with a large number of antennas, this practice of testing and maintaining for the legacy radio system is not applicable, and no extra functionality and protocol have been defined for near-real time, non-intrusive, and in-service monitoring methods.

Because precise control of both amplitude and phase is needed for beamforming, testing and fault isolation becomes even more critical in a massive MIMO AAS radio system. An issue arises in that test and fault isolation requirements are higher for a massive MIMO AAS radio system, but the ability for testing is lessened due to the integration of subsystems. Therefore, there is a need for systems and methods for testing and fault isolation that are well-suited for a massive MIMO AAS radio system.

SUMMARY

Systems and methods related to monitoring a status, or health, of a (e.g., massive) Multiple Input Multiple Output (MIMO) transceiver and, in particular, that of an antenna system (e.g., an Advanced Antenna System (AAS)) of the MIMO transceiver are disclosed. In some embodiments, a method of operation of a radio system implemented in a radio access node to perform supervision of a MIMO transceiver of the radio system comprises performing continuous over-the-air based supervision the MIMO transceiver of the radio system, determining a status of the MIMO transceiver based on results of performing continuous over-the-air based supervision of the MIMO transceiver of the radio system, and taking an action based on the status of the MIMO transceiver.

In some embodiments, performing continuous over-the-air supervision of the MIMO transceiver of the radio system comprises performing continuous over-the-air supervision of beam directivity and/or beam shape of the MIMO transceiver of the radio system.

In some embodiments, performing continuous over-the-air supervision of the MIMO transceiver of the radio system comprises performing continuous over-the-air supervision of one or more factors that impact beam directivity and/or beam shape of the MIMO transceiver of the radio system.

In some embodiments, performing continuous over-the-air based supervision of the MIMO transceiver of the radio system comprises performing continuous non-network-assisted over-the-air based supervision of the MIMO transceiver of the radio system.

In some embodiments, performing continuous non-network-assisted over-the-air based supervision of the MIMO transceiver of the radio system comprises obtaining received power measurements for signals received from two or more wireless devices mounted to a fixed or mobile test structure while the MIMO transceiver is configured to receive on a receive beam directed at a first wireless device of the two or more wireless devices. In some embodiments, determining the status of the MIMO transceiver comprises determining the status of the MIMO transceiver with respect to the receive beam based on a comparison of the received power measurement for the signal received from the first wireless device and the received power measurement for the signal received from each other wireless device of the two or more wireless devices.

In some embodiments, determining the status of the MIMO transceiver with respect to the receive beam based on the comparison of the received power for the signal received from the first wireless device and the received power for the signal received from each other wireless device of the two or more wireless devices comprises determining that the received power measurement for the signal received from the first wireless device is greater than the received power measurement for the signal received from each other wireless device of the two or more wireless devices by at least a predefined threshold amount, and determining that the status of the MIMO transceiver with respect to the receive beam is healthy upon determining that the received power measurement for the signal received from the first wireless device is greater than the received power measurement for the signal received from each other wireless device of the two or more wireless devices by at least the predefined threshold amount. In some embodiments, the wireless devices use the same transmit power. In some other embodiments, the wireless devices can use different transmit powers, and the received power measurements are normalized with respect to transmit power.

In some embodiments, determining the status of the MIMO transceiver with respect to the receive beam based on the comparison of the received power for the signal received from the first wireless device and the received power for the signal received from each other wireless device of the two or more wireless devices comprises determining that the received power measurement for the signal received from the first wireless device is not greater than the received power measurement for the signal received from each other wireless device of the two or more wireless devices by at least a predefined threshold amount, and determining that the status of the MIMO transceiver with respect to the receive beam is non-healthy upon determining that the received power measurement for the signal received from the first wireless device is not greater than the received power measurement for the signal received from each other wireless device of the two or more wireless devices by at least the predefined threshold amount. In some embodiments, the wireless devices use the same transmit power. In some other embodiments, the wireless devices can use different transmit powers, and the received power measurements are normalized with respect to transmit power.

In some embodiments, performing continuous non-network-assisted over-the-air based supervision of the MIMO transceiver of the radio system comprises transmitting a signal to a first wireless device of two or more wireless devices mounted to a fixed or mobile test structure while the MIMO transceiver is configured to transmit on a transmit beam directed at the first wireless device of the two or more wireless devices. In some embodiments, determining the status of the MIMO transceiver comprises obtaining a received power for the signal at each of the two or more wireless devices and determining the status of the MIMO transceiver with respect to the transmit beam based on a comparison of the received power for the signal at the first wireless device and the received power for the signal at each other wireless device of the two or more wireless devices.

In some embodiments, determining the status of the MIMO transceiver with respect to the transmit beam based on the comparison of the received power for the signal received at the first wireless device and the received power for the signal received at each other wireless device of the two or more wireless devices comprises determining that the received power for the signal at the first wireless device is greater than the received power for the signal at each other wireless device of the two or more wireless devices by at least a predefined threshold amount, determining that the status of the MIMO transceiver with respect to the transmit beam is healthy upon determining that the received power for the signal at the first wireless device is greater than the received power for the signal at each other wireless device of the two or more wireless devices by at least the predefined threshold amount.

In some embodiments, determining the status of the MIMO transceiver with respect to the transmit beam based on the comparison of the received power for the signal at the first wireless device and the received power for the signal at each other wireless device of the two or more wireless devices comprises determining that the received power for the signal at the first wireless device is not greater than the received power for the signal at each other wireless device of the two or more wireless devices by at least a predefined threshold amount, and determining that the status of the MIMO transceiver with respect to the transmit beam is non-healthy upon determining that the received power for the signal at the first wireless device is not greater than the received power for the signal at each other wireless device of the two or more wireless devices by at least the predefined threshold amount.

In some embodiments, performing continuous non-network-assisted over-the-air based supervision of the MIMO transceiver of the radio system comprises obtaining a received power measurement for a signal received from a wireless device located at a cell edge between a first cell served by the radio system and one or more additional cells served by one or more additional radio access nodes and determining the status of the MIMO transceiver comprises determining the status of the MIMO transceiver based on a comparison of the received power measurement for the signal received from the wireless device to a reference value and information that is related to a received power for a signal from the wireless device received at the one or more additional radio access nodes.

In some embodiments, determining the status of the MIMO transceiver comprises determining that the status of the MIMO transceiver is healthy if the received power measurement for the signal received from the wireless device is within a predefined range of the reference value.

In some embodiments, determining the status of the MIMO transceiver comprises determining that the status of the MIMO transceiver is unhealthy if the received power measurement for the signal received from the wireless device is not within the predefined range of the reference value and the information that is related to the received power for the signal from the wireless device received at the one or more additional radio access nodes indicates that the received power for the signal from the wireless device received at the one or more additional radio access nodes is within a predefined range relative to respective reference values.

In some embodiments, performing continuous over-the-air based supervision of the MIMO transceiver of the radio system comprises performing continuous network-assisted over-the-air based supervision of the MIMO transceiver of the radio system.

In some embodiments, performing continuous network-assisted over-the-air based supervision of beam directivity and/or beam shape of the MIMO transceiver of the radio system comprises transmitting a test signal to a neighboring radio access node using one or more transmit beams in a direction of the neighboring radio access node and receiving, from the neighboring radio access node, an indication of whether the neighboring radio access node detected an impairment to the one or more transmit beams in the direction of the neighboring radio access node.

In some embodiments, performing continuous network-assisted over-the-air based supervision of beam directivity and/or beam shape of the MIMO transceiver of the radio system further comprises, upon determining that there is an impairment to the one or more transmit beams based on the indication received from the neighboring radio access node, for each additional neighboring radio access node of at least one additional neighboring radio access node: transmitting a second test signal to the additional neighboring radio access node using one or more transmit beams in a direction of the additional neighboring radio access node and receiving, from the additional neighboring radio access node, an indication of whether the additional neighboring radio access node detected an impairment to the one or more transmit beams in the direction of the additional neighboring radio access node.

In some embodiments, determining the status of the MIMO transceiver comprises determining that there is an error in the MIMO transceiver based on the indications received from the neighboring radio access node and the at least one additional neighboring radio access node and taking the action based on the status of the MIMO transceiver comprises initiating one or more actions to address the error.

In some embodiments, transmitting the test signal to the neighboring radio access node comprises tilting one or more beams and toward the neighboring radio access node to thereby provide the one or more transmit beams in the direction of the neighboring radio access node.

Some embodiments comprise performing continuous network-assisted over-the-air based supervision of beam directivity and/or beam shape of the MIMO transceiver of the radio system while the radio access node is in service.

Embodiments of a radio system implemented in a radio access node are also disclosed. In some embodiments, a radio system implemented in a radio access node comprises a MIMO transceiver and processing circuitry configured to perform continuous over-the-air based supervision of the MIMO transceiver of the radio system, determining a status of the MIMO transceiver based on results of performing the continuous over-the-air based supervision of the MIMO transceiver of the radio system, and taking an action based on the status of the MIMO transceiver.

In some embodiments, a radio system implemented in a radio access node comprises a supervising module operable to perform continuous over-the-air based supervision of a MIMO transceiver of the radio system, a determining module operable to determine a status of the MIMO transceiver based on results of performing the continuous over-the-air based supervision of the MIMO transceiver of the radio system, and an acting module operable to take an action based on the status of the MIMO transceiver.

In some embodiments, a method of operation of a radio system implemented in a radio access node to perform supervision of a MIMO transceiver of the radio system comprises obtaining reference measurements for one or more observation points within each of at least a subset of a plurality of transceiver branches of the MIMO transceiver for a plurality of beams and performing continuous supervision of the MIMO transceiver, wherein performing continuous supervision of the MIMO transceiver comprises obtaining test measurements for the one or more observation points within each of the at least a subset of the plurality of transceiver branches of the MIMO transceiver for each of the plurality of beams. The method further comprises determining a status of the MIMO transceiver based on comparisons of the test measurements to the reference measurements, respectively, and taking an action based on the status of the MIMO transceiver.

In some embodiments, obtaining the reference measurements comprises obtaining the reference measurements after the radio system is deployed in an environment at a deployment site at which the radio system is to operate and internal settings of the radio system are tuned to the deployment site.

In some embodiments, the plurality of beams comprises a plurality of transmit beams, and obtaining the test measurements comprises, for each transmit beam of the plurality of transmit beams: transmitting a known signal on the transmit beam via transmitters of the plurality of transceiver branches and obtaining test measurements for at least one of the one or more observation points within each of the at least a subset of the plurality of transceiver branches while transmitting the known signal on the transmit beam. The known signal is a same known signal as that transmitted via the plurality of transceiver branches on the transmit beam while obtaining the respective reference measurements for the transmit beam or a derivative thereof.

In some embodiments, the plurality of beams comprises a plurality of receive beams, and obtaining the test measurements comprises, for each receive beam of the plurality of receive beams: injecting a known signal for the receive beam into receivers of the plurality of transceiver branches and obtaining test measurements for at least one of the one or more observation points within each of the at least a subset of the plurality of transceiver branches while injecting the known signal. The known signal is a same known signal as that injected into the receivers of the plurality of transceiver branches while obtaining the respective reference measurements or a derivative thereof.

In some embodiments, the one or more observation points within each of the at least a subset of the plurality of transceiver branches of the MIMO transceiver comprise: an observation point at an input, an output, or an internal point within an equalizer within the transceiver branch; an observation point at an input, an output, or an internal point within a transmitter within the transceiver branch; an observation point at an input, an output, or an internal point within a receiver within the transceiver branch; and/or an observation point near an antenna port of the transceiver branch.

In some embodiments, performing continuous supervision of the MIMO transceiver further comprises performing continuous over-the-air based supervision of beam directivity and/or beam shape of the MIMO transceiver of the radio system.

In some embodiments, a radio system implemented in a radio access node comprises a MIMO transceiver and processing circuitry configured to obtain reference measurements for one or more observation points within each of at least a subset of a plurality of transceiver branches of the MIMO transceiver for a plurality of beam directions and perform continuous supervision of the MIMO transceiver, wherein, in order to perform continuous supervision of the MIMO transceiver, the processing circuitry is further configured to obtain test measurements for the one or more observation points within each of the at least a subset of the plurality of transceiver branches of the MIMO transceiver for each of the plurality of beam directions. The processing circuitry is further configured to determine a status of the MIMO transceiver based on comparisons of the test measurements to the reference measurements, respectively, and take an action based on the status of the MIMO transceiver.

In some embodiments, a radio system implemented in a radio access node comprises an obtaining module operable to obtain reference measurements for one or more observation points within each of at least a subset of a plurality of transceiver branches of a MIMO transceiver for a plurality of beam directions; a supervision module operable to perform continuous supervision of the MIMO transceiver, wherein, in order to perform continuous supervision of the MIMO transceiver, the supervision module is further operable to obtain test measurements for the one or more observation points within each of the at least a subset of the plurality of transceiver branches of the MIMO transceiver for each of the plurality of beam directions; a determining module operable to determine a status of the MIMO transceiver based on comparisons of the test measurements to the reference measurements, respectively; and an acting module operable to take an action based on the status of the MIMO transceiver.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
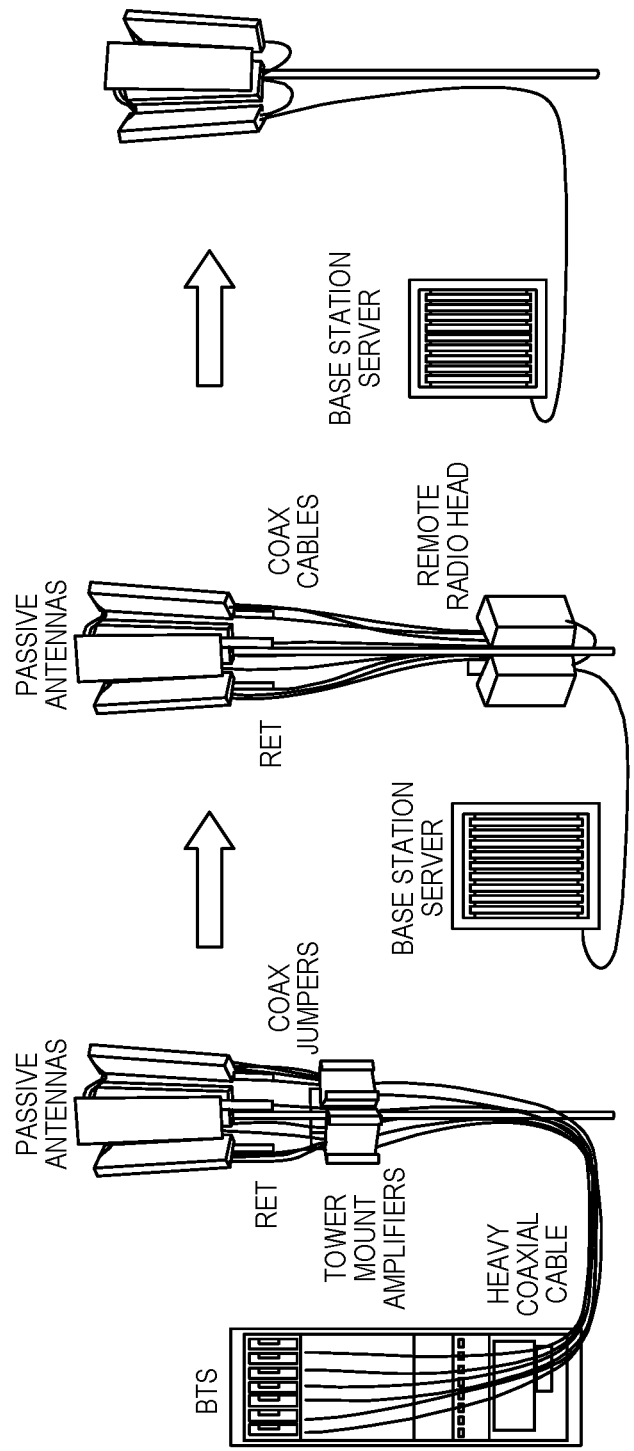
FIG. 1 is a graphical illustration of one issue resulting of a massive Multiple Input Multiple Output (MIMO) Advanced Antenna System (AAS) as compared to conventional radio architectures.
Figure 2:
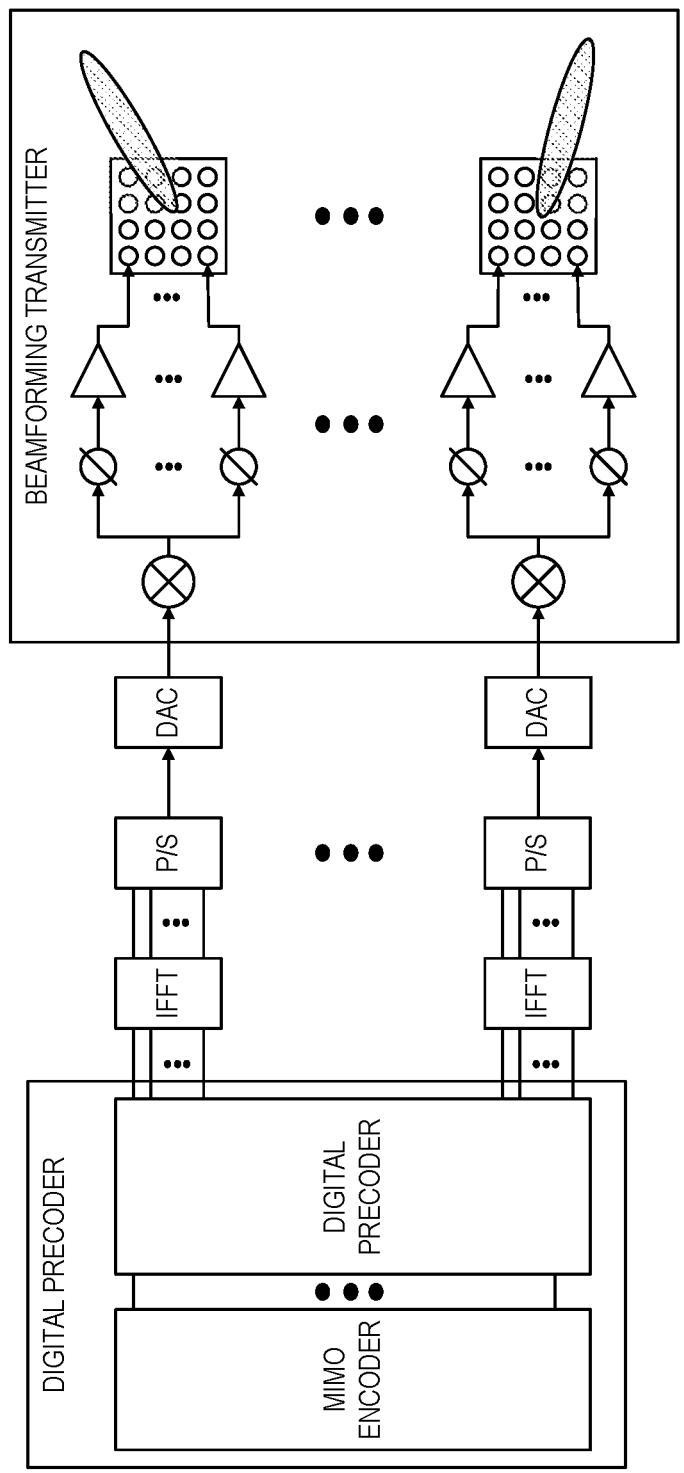
FIG. 2 illustrates one example of a massive MIMO AAS radio system that utilizes beamforming.
Figure 3:
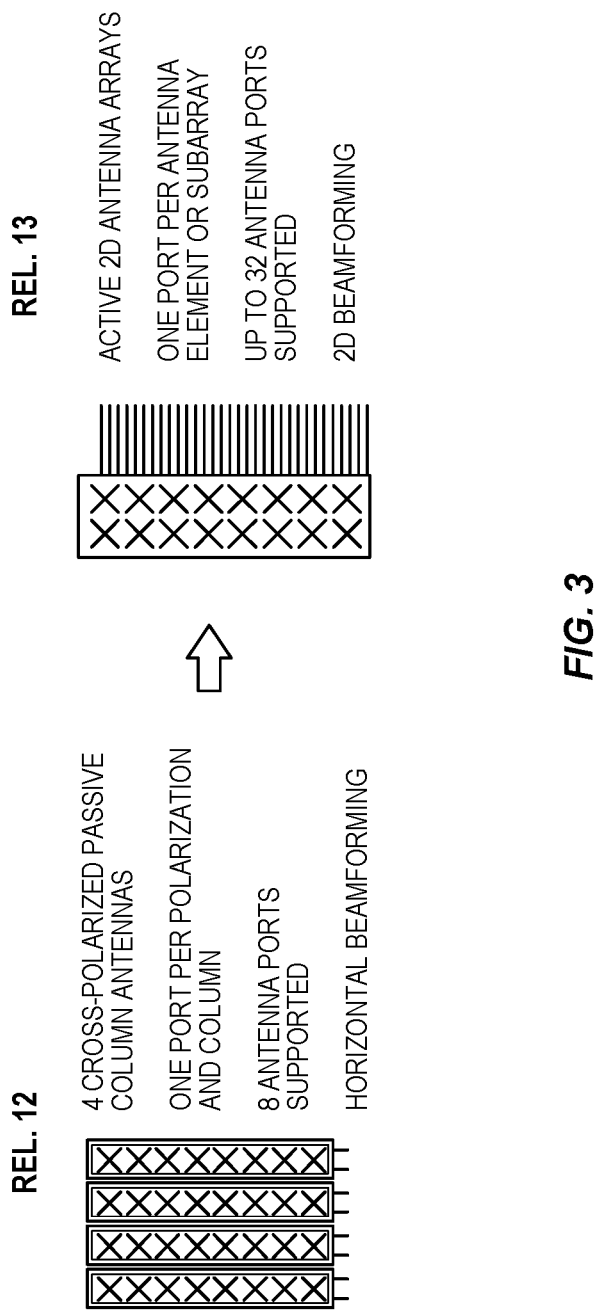
FIG. 3 illustrates example antenna arrays.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node:

As used herein, a "radio node" is either a radio access node or a wireless device.

Radio Access Node:

As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node:

As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device:

As used herein, a "wireless device" refers to a device capable, configured, arranged, and/or operable to communicate wirelessly with network nodes and/or other wireless devices. Unless otherwise noted, the term wireless device may be used interchangeably herein with User Equipment device (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a Voice over Internet Protocol (IP) (VoIP) phone, a wireless local loop phone, a desktop computer, a Personal Digital Assistant (PDA), a wireless camera, a gaming console or device, a music storage device, a playback appliance, a wearable terminal device, a wireless endpoint, a mobile station, a tablet, a laptop, Laptop Embedded Equipment (LEE), Laptop Mounted Equipment (LME), a smart device, a wireless Customer Premise Equipment (CPE), a vehicle mounted wireless terminal device, etc. A wireless device may support Device-to-Device (D2D) communication, for example by implementing a 3GPP standard for sidelink communication, Vehicle-to-Vehicle (V2V), Vehicle-to-Infrastructure (V2I), Vehicle-to-Everything (V2X), and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a Machine-to-Machine (M2M) device, which may in a 3GPP context be referred to as a Machine Type Communication (MTC) device. As one particular example, the wireless device may be a UE implementing the 3GPP Narrowband IoT (NB-IoT) standard. Particular examples of such machines or devices are sensors, metering devices such as power meters, industrial machinery, home or personal appliances (e.g., refrigerators, televisions, etc.), or personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

Network Node:

As used herein, a "network node" is any node that is either part of the radio access network or the core network of a cellular communications network/system. In particular, a network node refers to equipment capable, configured, arranged, and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, Access Points (APs) (e.g., radio APs) and base stations (e.g., radio base stations, Node Bs, eNBs, and gNBs). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or Remote Radio Units (RRUs), sometimes referred to as Remote Radio Heads (RRHs). Such RRUs may or may not be integrated with an antenna as an antenna integrated radio. Parts of a distributed radio base station may also be referred to as nodes in a Distributed Antenna System (DAS). Yet further examples of network nodes include Multi-Standard Radio (MSR) equipment such as MSR base stations, network controllers such as Radio Network Controllers (RNCs) or Base Station Controllers (BSCs), Base Transceiver Stations (BTSs), transmission points, transmission nodes, Multi-Cell/Multicast Coordination Entities (MCEs), core network nodes (e.g., Mobile Switching Centers (MSCs), MMEs), Operation and Maintenance (O&M) nodes, Operations Support System (OSS) nodes, Self-Organizing Network (SON) nodes, positioning nodes (e.g., Evolved Serving Mobile Location Center (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

Note that the description given herein focuses on a 3GPP cellular communications system and, as such, 3GPP terminology or terminology similar to 3GPP terminology is oftentimes used. However, the concepts disclosed herein are not limited to a 3GPP system.

Existing solutions for testing and fault detection in an Advanced Antenna System (AAS) are not scalable for a massive Multiple Input Multiple Output (MIMO) AAS. In other words, existing testing methods and equipment are not able to provide the testing capability needed for a massive MIMO AAS. In particular, existing testing methods and equipment to not provide the capability to test a large number of beams radiated out of a massive MIMO AAS with a large number of ports accessible to a digital unit.

Note that AAS may interchangeably be referred to as an Advanced Antenna System, an Active Antenna System, or an Antenna Array System. For this disclosure, the term Advanced Antenna System is used.

For legacy radio systems, the antenna radiating pattern is assumed to be omni-directional and tuned at the factory, and the number of physical antenna ports is limited. Chamber based measurements are used for legacy radio systems. However, such chamber based measurements are not scalable for a massive MIMO AAS radio system due to the cost of having an exponential increase in the number of observation devices and the extra distance needed to obtain beamforming far-field measurements (e.g., $n > n_f = L^2/2\lambda$, where L is the height or width of the antenna array, $\lambda$ is the wavelength, and n is distance of the observation point from the antenna array), without which the measurement granularity and accuracy is not sufficient. Also, failure of an individual antenna branch may or may not cause significant measurable impacts on the beamforming and MIMO capability that need to be provided by the massive MIMO AAS radio system since, for example, not all beams may be used by the massive MIMO AAS radio system. Also, for legacy radio systems, road testing is used for radiated signal measurement. However, road testing is not practical for beam profiling for a massive MIMO AAS radio system, especially for beams in both horizontal and vertical directions.

Legacy radio systems also lack continuous supervision (i.e., monitoring). After deployment, the wellness of a massive MIMO AAS radio system, and in particular the wellness of the massive MIMO AAS, needs to be continuously monitored. A legacy radio system might only be monitored, occasionally or with relatively long periodicity, by a few key characteristics (i.e., installation, power supply). Conversely, a massive MIMO AAS radio system needs to be continuously monitored because its beamforming performance depends on the wellness of each antenna element and how the antenna elements are working together cooperatively to provide the desired beamforming. For some cases, a relatively narrow beam is desired to point to a certain direction (e.g., a particular floor of a building). A particular beam is formed by a certain set of spatially coherent antennas. Malfunction of any single antenna might have a limited impact on the overall functioning of the antenna system, but might have a huge impact on a particular beam. Further, the external physical environment might impact the antenna performance, especially for millimeter wave (mmW). Radio systems using mmW have very large path loss due to tree leaves, heavy rain, or some blockage materials. The blockage might happen gradually (i.e., growing trees or a new building development), or by accident (e.g., a falling tree in front of the antenna). Note that 5G and mmW will likely be deployed in urban areas where, e.g., new building developments are likely to occur. Another situation is an indoor environment in which walls may be taken down or added.

Systems and methods are disclosed herein that relate to continuous supervision, or monitoring, of a MIMO transceiver (e.g., a massive MIMO transceiver or radio system implementing an AAS). In some embodiments, internal radio component based supervision is performed. In some embodiments, the internal radio component based supervision uses a test fixture or baseband unit as a test signal source and test signal sink. In some embodiments, the MIMO transceiver is implemented in a radio unit of a radio access node of a wireless communication system (e.g., a 3GPP 5G NR system), and the internal radio component based supervision is performed preferably at the factory and periodically by a baseband unit of the radio access node on-site. While many of the disclosed embodiments focus on AAS, they are not limited to AAS. For example, certain disclosed embodiments or aspects of the disclosure are applicable to passive antennas.

In some embodiments, external over-the-air based supervision is additionally or alternatively performed. In some embodiments, the MIMO transceiver is a (e.g., massive) MIMO transceiver that includes a (e.g., massive) MIMO AAS and is implemented in a radio unit of a radio access node of a wireless communication system (e.g., a 3GPP 5G NR system). Further, in some embodiments, one or more mobile wireless devices, one or more fixed or mounted wirelines devices, and/or one or more other radio access nodes are used to perform external over-the-air based supervision in order to, e.g., validate beamforming functionality of the (e.g., massive) MIMO AAS of the transceiver.

Figure 4:
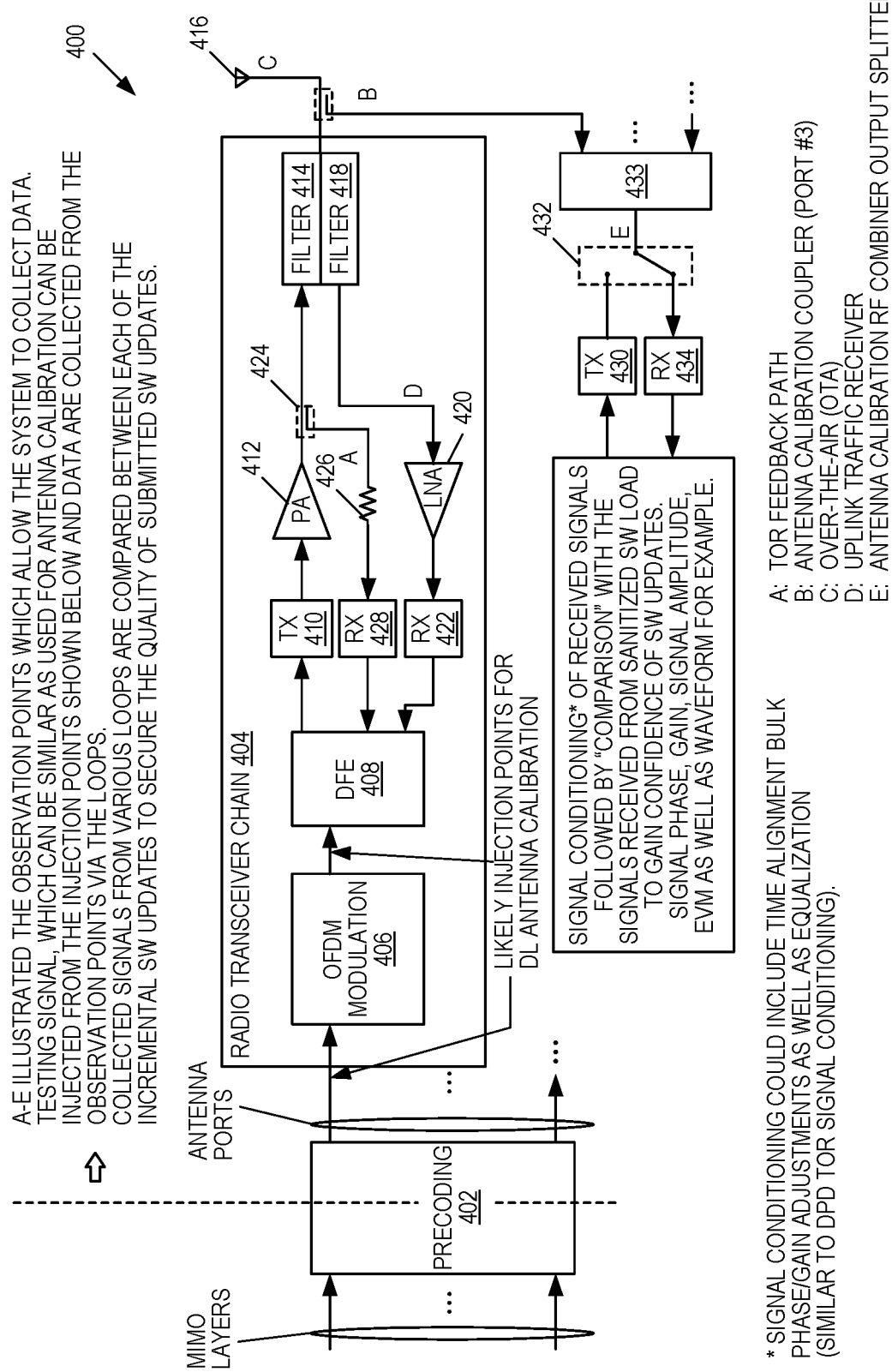
FIG. 4 illustrates an example radio system that includes a number of observation points.

Before describing embodiments of the present disclosure, it is beneficial to describe one example of a radio system 400 illustrated in FIG. 4 that incorporates a (e.g., massive) MIMO AAS in accordance with some embodiments of the present disclosure. The radio system 400 is also referred to herein as a MIMO transceiver. As illustrated, the radio system 400 includes precoding circuitry 402 that precodes a number of input signals for multiple MIMO layers to provide a number of transmit signals to be transmitted via respective antenna branches. The radio system 400 includes multiple radio transceiver chains 404, only one of which is illustrated in detail. There is one radio transceiver chain 404 for each antenna element. Each radio transceiver chain 404 includes a transmit path and a receive path. The transmit path includes modulation circuitry 406 that performs Orthogonal Frequency Division Multiplexing (OFDM) modulation of a respective transmit signal output by the precoding circuitry 402 and a Digital Front End (DFE) 408 that processes the modulated transmit signal output by the modulation circuitry 406. The transmit path further includes a transmitter 410 that processes the transmit signal output by the DFE 408 to perform various transmit operations such as, e.g., digital to analog conversion, upconversion, and filtering, a power amplifier 412 that amplifies the Radio Frequency (RF) transmit signal and a transmit filter 414 that filters the amplified RF transmit signal prior to transmission via a respective antenna element 416. Each radio transceiver chain also includes a receive path that includes a receive filter 418 that receives a signal via the antenna element 416, a Low Noise Amplifier (LNA) 420 that amplifies the received signal, a main receiver 422 that processes the received signal (e.g., filtering, downconversion, and analog to digital conversion) to provide a digital receive signal that is then processed by the DFE 408. In addition, the radio transceiver chain includes a transmit observation path that includes a coupler 424, an attenuator 426, and an observation receiver 428.

The example radio system 400 also includes transmit circuitry 430 configured to inject a test signal into the transmit paths of the radio transceiver chains 404 via switching circuitry 432 and a combiner/splitter 433. The combiner/splitter 433 is to accommodate RX and TX signals for, e.g., calibration. The radio system 400 also includes receive circuitry 434 configured to receive a signal(s) from the radio transceiver chain(s) 404 via the switching circuitry 432 and the combiner/splitter 433.

The radio system 400 has multiple observation points (A through E) that can be used by a monitoring system. Observation point A is the Transmit Observation Receiver (TOR) feedback path used for, e.g., Digital Predistortion (DPD) adaptation to compensate for the non-linearity of the power amplifier 412. Observation point B is the antenna calibration coupler. Observation point C is an over-the-air observation point. Observation point D is an uplink traffic receiver. Observation point E is an antenna calibration RF combiner output splitter input. Observation points B and E may be used for, e.g., antenna calibration.

In some embodiments, one or more of the observation points A through E are reused for continuous monitoring of the radio system 400. For example, one or more of these observation points can be reused together with one or more test vector signals to monitor the radio system 400 by, e.g., comparing signals at the observation point(s) to reference values while injecting a test vector signal into the radio system 400. This may be beneficial to combat the challenge of sanitizing software code towards the correct behavior in the massive MIMO and beamforming domain (i.e., ensuring RF performance remains compliant, e.g., with government regulations after a new software upgrade is applied). This improvement can be applied in manufactory plants for hardware related tests. More importantly, during radio installation phase and in-service time, the internal component based supervision capabilities within each radio access node and between radio access nodes can be enabled to fulfill more precise supervision and to detect problems in the massive MIMO and beamforming areas, both before a site is put into service or during in-service.

Figure 5:
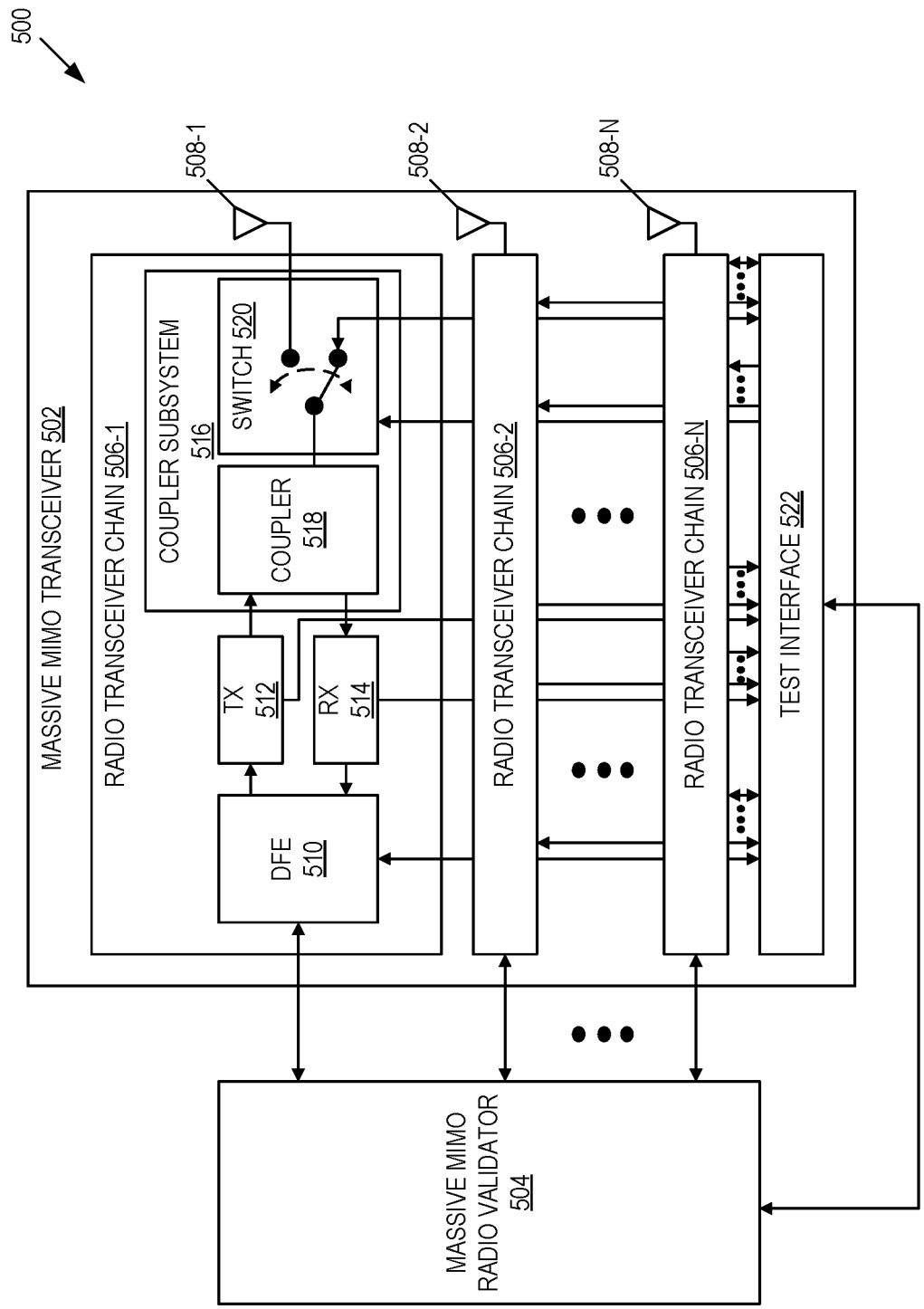
FIG. 5 illustrates a radio system according to some embodiments of the present disclosure.

FIG. 5 illustrates a radio system 500 according to some embodiments of the present disclosure. As illustrated, the radio system 500 includes a massive MIMO transceiver 502 and a massive MIMO radio validator 504. Here, the massive MIMO transceiver 502 is a Device-Under-Test (DUT), and the massive MIMO radio validator 504 performs continuous internal and/or over-the-air supervision of the MIMO transceiver 502. The massive MIMO radio validator 504 is preferably implemented in a digital unit of the radio system 500. For example, in some embodiments, the radio system 500 is a radio access node (e.g., a base station) in a wireless communication system (e.g., a 5G NR system), where the massive MIMO transceiver 502 is implemented in a radio unit of the radio access node and the massive MIMO radio validator 504 is implemented within a digital unit of the radio access node. The massive MIMO radio validator 504 is implemented in hardware or a combination of hardware and software (e.g., one or more processing circuitries such as, e.g., one or more Application Specific Integrated Circuits (ASICs), one or more Digital Signal Processors (DSPs), one or more Field Programmable Gate Arrays (FPGAs), and/or the like, or any combination thereof).

The massive MIMO transceiver 502 includes a number of radio transceiver chains 506-1 through 506-N (generally referred to herein as radio transceiver chains 506). The radio transceiver chains 506-1 through 506-N are coupled to respective antenna elements 508-1 through 508-N (generally referred to herein as antenna elements 508). Preferably, N is a value that is relatively large, e.g., $\geq 8$, $\geq 16$, $\geq 64$, or $\geq 100$. Looking at the radio transceiver chain 506-1 as an example, each radio transceiver chain 506 includes, in this example, a DFE 510, a transmitter 512, a receiver 514, and a coupler subsystem 516 interconnecting the transmitter 512 and the receiver 514 to the respective antenna element 508. In this example, the coupler subsystem 516 includes a coupler 518 and switching circuitry 520.

In addition, the massive MIMO transceiver 502 includes a test interface 522 that provides an interface between various observation points and, optionally, signal injection points within the radio transceiver chains 506 and the massive MIMO radio validator 504. In this example, the observation points include observation points within the DFEs 510 of the radio transceiver chains 506, observation points within the transmitters 512 of the radio transceiver chains 506, observation points within the receivers 514 of the radio transceiver chains 506, and observation points at the antenna elements 508, which in this example are located in the switching circuitry 520. In this example, the signal injection points include injection points into the receive paths of the radio transceiver chains 506, which in this example are located within the switching circuitry 520. The test interface 522 also includes a control interface that enables the massive MIMO radio validator 504 to control the switching circuitry 520 in the radio transceiver chains 506 to, e.g., either inject a signal into the receive paths, monitor the signals at the antenna port of the coupler 518, or enable normal operation by coupling the antenna port of the couplers 518 to the respective antenna elements 508. The observation points are along the path including the DFE 510, the transmitter 512, and the receiver 514. Note that when a test signal is used, the signal at a particular observation point is no longer the test signal but some transformed version of the test signal.

Figure 6:
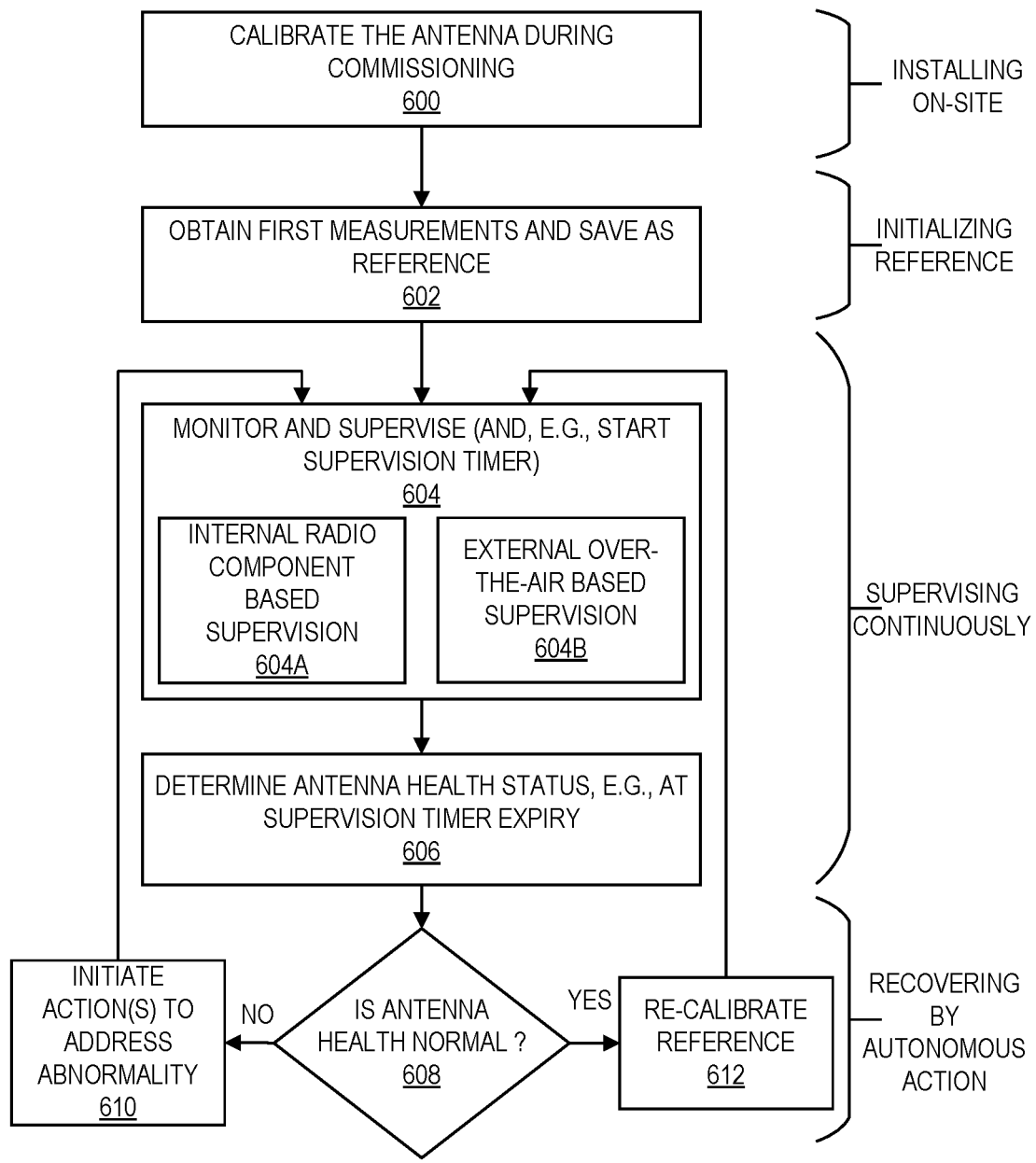
FIG. 6 is a flow chart that illustrates a process for continuous supervision of the MIMO transceiver of the radio system of FIG. 5 according to some embodiments of the present disclosure.

FIG. 6 is a flow chart that illustrates the operation of the massive MIMO radio validator 504 of FIG. 5 according to some embodiments of the present disclosure. For this discussion, the radio system 500 is a radio access node (e.g., a base station), where the massive MIMO transceiver 502 is implemented in a radio unit of the radio access node and the massive MIMO radio validator 504 is implemented in a digital unit of the radio access node. As illustrated, the massive MIMO radio validator 504 calibrates the antenna elements 508 and the radio transceiver chains 506 of the massive MIMO transceiver 502 during commissioning of the radio system 500 (step 600). In some embodiments, the radio system 500 is part of a radio access node (e.g., a base station), and step 600 is performed at the time of commissioning, i.e., when installing the radio unit of the radio access node at a particular site. Note that a particular radio access node (e.g., a base station) may have or be connected to multiple radio systems 500, wherein this process is performed for each of those radio systems 500.

More specifically, as of the practice today, the radio unit including the massive MIMO transceiver 502 is subject to calibration in the factory using, e.g., a test fixture with a set of predefined input. The goal is that, after calibration, the radio unit will not deviate outside the tolerance of a defined performance specification. In other words, some level of uniformity can be achieved across batches of radio units heading to respective installation sites.

Step 600 enhances the on-site installation procedure. In particular, today, a radio system performs a self-test at start-up. However, this legacy approach is insufficient for the massive MIMO transceiver 502 because successful digital beamforming requires the baseband unit as well. Thus, during the installation phase or on-site installation, the massive MIMO radio validator 504, which is implemented in the baseband unit of the radio system 500, emits test signals. Together with the massive MIMO transceiver 502 in the radio unit of the radio system 500, the massive MIMO radio validator 504 performs test procedures. In this regard, the baseband unit acts like the test fixture in the factory and must take part in the validation using calibration reference values obtained from the factory.

This one-time on-site recalibration is beneficial. Typically, new software is applied to the radio system 500 since it left the factory, and the hardware has been subjected to transportation. It also confirms the on-site installation, such as cabling, is correct. The objective is to ensure that the radio system 500 works as desired to support beamforming and MIMO functionalities.

It should be noted that the antenna elements 508 may not be connected to the massive MIMO transceiver 502 at this stage. This is typically a preparation phase before over-the-air radiation is allowed.

This on-site calibration procedure 600 can be triggered in many ways. For example, on initial power-up, the on-site calibration procedure 600 can be triggered autonomously and/or automatically and/or manually or by a special command, a test button (or switch), or the like.

The massive MIMO radio validator 504 obtains first measurements and saves these first measurements as reference values (step 602). The first measurements include measurements performed for internal radio component based supervision and/or measurements performed for over-the-air based supervision. More specifically, in some embodiments, the massive MIMO radio validator 504 provides test signals to the radio transceiver chains 506 of the massive MIMO transceiver 502. These test signals may include test signals input to the radio transceiver chains 506 as transmit signals to be transmitted via the transmit paths of the radio transceiver chains 506 and/or test signals injected into the receive paths of the radio transceiver chains 506 via the switching circuitry 520 of the radio transceiver chains 506. While these test signals are being provided to the radio transceiver chains 506, measurements are obtained from one or more of the observations points for one or more, and preferably all, of the radio transceiver chains 506. These measurements are the first measurements that are stored as reference values.

In a similar manner, first measurements to be used for reference values for over-the-air based supervision may be obtained. In some embodiments, test signals are transmitted by the radio system 500 and measured by wireless devices mounted to a mobile or stationary test fixture and/or measured by another radio access node(s). In some other embodiments, test signals are transmitted by wireless devices mounted to a mobile or stationary test fixture and/or transmitted by another radio access node(s) are measured by the radio system 500. These measurements are then stored as reference values.

In some embodiments, step 602 is performed the first time that the radio unit of the radio system 500 is connected to the antenna elements 508 and the radio access node is placed into service. Thus, the first measurements establish the initial measurements as the radio system 500 is deployed and in operation.

Here, the first measurements are stored as reference values that reflect the actual radio status in the actual deployment environment where internal radio component settings are tuned to the specific site location based on network planning. The measurements at the installation phase are a calibration to the standard environment and radio component settings. For example, the antenna elements 508 may be under the shadow of a tall building, and this will be collected and archived as a reference.

As stated above, the first measurements are stored, e.g., locally in the radio system 500 and/or remotely at a central processing unit. The first measurement results are kept as the reference values, e.g., until re-calibration is performed at which time the reference values are updated. At the same time, each parameter has a pre-set threshold for the measurement variation associated with the calibrated value. If any of the first measurements fall outside of the pre-set threshold range, warnings can be generated to the operator right away and, therefore, problems can be corrected before the operator leaves the site.

In some embodiments, the measurements from all monitoring categories are carried out during this phase. Further, in some embodiments, a timer of each measurement and a timer of the corresponding reporting are set to desired values at the completion of step 602. Note that a single supervision timer may be used or multiple supervision timers may be used for different categories of measurements.

The massive MIMO radio validator 504 then performs continuous monitoring of the massive MIMO transceiver 502 (step 604). This continuous monitoring includes continuous internal radio component based supervision (step 604A) and/or continuous over-the-air based supervision (step 604B).

With respect to the internal radio component based supervision, the massive MIMO radio validator 504 again provides the known test signals to the radio transceiver chains 506 of the massive MIMO transceiver 502 and obtains measurements from one or more of the observation points for the radio transceiver chains 506 (via the test interface 522). Here, the test signals are preferably the same as those used to obtain the reference measurements. These measurements can be compared to the stored reference values to determine the status, or health, of the massive MIMO transceiver 502, as described below.

The internal radio component based supervision is used to periodically collect measurements that, when compared to corresponding reference values, are indicative of the status of the massive MIMO transceiver 502. The internal radio component based supervision, and in particular the measurements collected via the internal radio component based supervision, can be performed as frequently as needed or desired. For instance, the internal radio component based supervision may be performed as frequently as, e.g., antenna calibration to monitor the health of the transmit and receive paths. As discussed below, if the collected measurements differ from the corresponding reference values by more than a predefined threshold amount, the massive MIMO radio validator 504 reports an error to, e.g., an operator (user) and/or another system component such as, e.g., a fault handling process. One or more actions may be taken in response to the indication of the error such as, e.g., adjusting the beamforming method to adapt to the fault before the fix or replacement (e.g., by using a new beamforming pattern or otherwise compensating for the fault), or declaring a radio hardware fault for replacement.

With respect to over-the-air supervision, the massive MIMO radio validator 504 operates to perform one or more over-the-air supervision procedures that work together with one or more wireless devices and/or one or more other radio access nodes to determine the status of the massive MIMO transceiver 502. In some embodiments, the external over-the-air supervision obtains periodic measurements using one or more wireless devices and/or one or more other radio access nodes to determine whether the performance of the massive MIMO transceiver 502 satisfies one or more predefined conditions. In some embodiments, the over-the-air supervision is performed during quiet times, e.g., during night-time hours or during a maintenance window. In some embodiments, when the measurements for over-the-air supervision are performed, test signals are transmitted by the radio system 500 and measured by wireless devices mounted to a selected mobile or stationary test fixture and/or measured by another radio access node(s). Measurements made with respect to the selected mobile or stationary test structure are repeatable. In some other embodiments, test signals transmitted by wireless devices mounted to a mobile or stationary test fixture and/or transmitted by another radio access node(s) are measured by the radio system 500. These measurements are then used to determine a status of the massive MIMO transceiver 502 by, e.g., comparing the measurements to a stored reference value. In some embodiments, an existing digital beam tilting capability of the radio access node is used during testing to facilitate more targeted testing (e.g., to point to a specific portion of the antenna array of the in-test radio access node). Additional details of embodiments of the over-the-air supervision are described below.

At some point, the massive MIMO radio validator 504 determines a health, or status, of the massive MIMO transceiver 502 and, in particular, the antenna element 508 based on the measurements collected in step 604 (step 608). For example, a timer may be used. The supervision of step 604 is performed as long as the timer has not expired. Once the timer has expired, the massive MIMO radio validator 504 determines the health of the massive MIMO transceiver 502 based on the collected measurements. In some embodiments, the collected measurements are compared to the reference measurements obtained in step 602. If the collected measurements do not deviate from the reference values by more than a predefined amount, the massive MIMO transceiver 502 is determined to be healthy. However, if any of the collected measurements do deviate from the reference values by more than a predefined amount, the massive MIMO transceiver 502 is determined to be non-healthy. Note that as used herein "non-healthy" means that there is an abnormality, where this abnormality may be due to a hardware fault in the massive MIMO transceiver 502 or a change in environmental conditions (e.g., a new obstruction).

If the status of the massive MIMO transceiver 502 is non-healthy (i.e., if the health is determined to not be normal) (step 608, NO), then the massive MIMO radio validator 504 initiates one or more actions to correct this error (step 610). For example, the massive MIMO radio validator 504 may inform an operator of the error and/or inform another system component that is responsible for fault correction of the error. The action(s) taken to the correct this error may be, for example, adjusting the beamforming method to adapt to the fault before the fix or replacement (e.g., by using a new beamforming pattern or otherwise compensating for the fault), or declaring a radio hardware fault for replacement. If the status of the massive MIMO transceiver 502 is healthy (i.e., if the health is determined to be normal) (step 608, YES), then the massive MIMO radio validator 504 re-calibrates the reference values using the measurements obtained in step 604, if needed or otherwise desired (step 612). Whether proceeding from step 610 or 612, the process then returns to step 604 and is repeated.

Note that, in some embodiments, the radio system 500 is able to recover, or at least attempt to recover, from a detected error by an autonomous action(s). In particular, when the supervision detects an error, a fault handling process decides whether to (a) continue operation with a modified beamforming or MIMO strategy with re-calibration or (b) take some other action(s) such as restarting the massive MIMO transceiver 502 or requesting that an operator replace the massive MIMO transceiver 502 by alerting the operator of the error.

Figure 7:
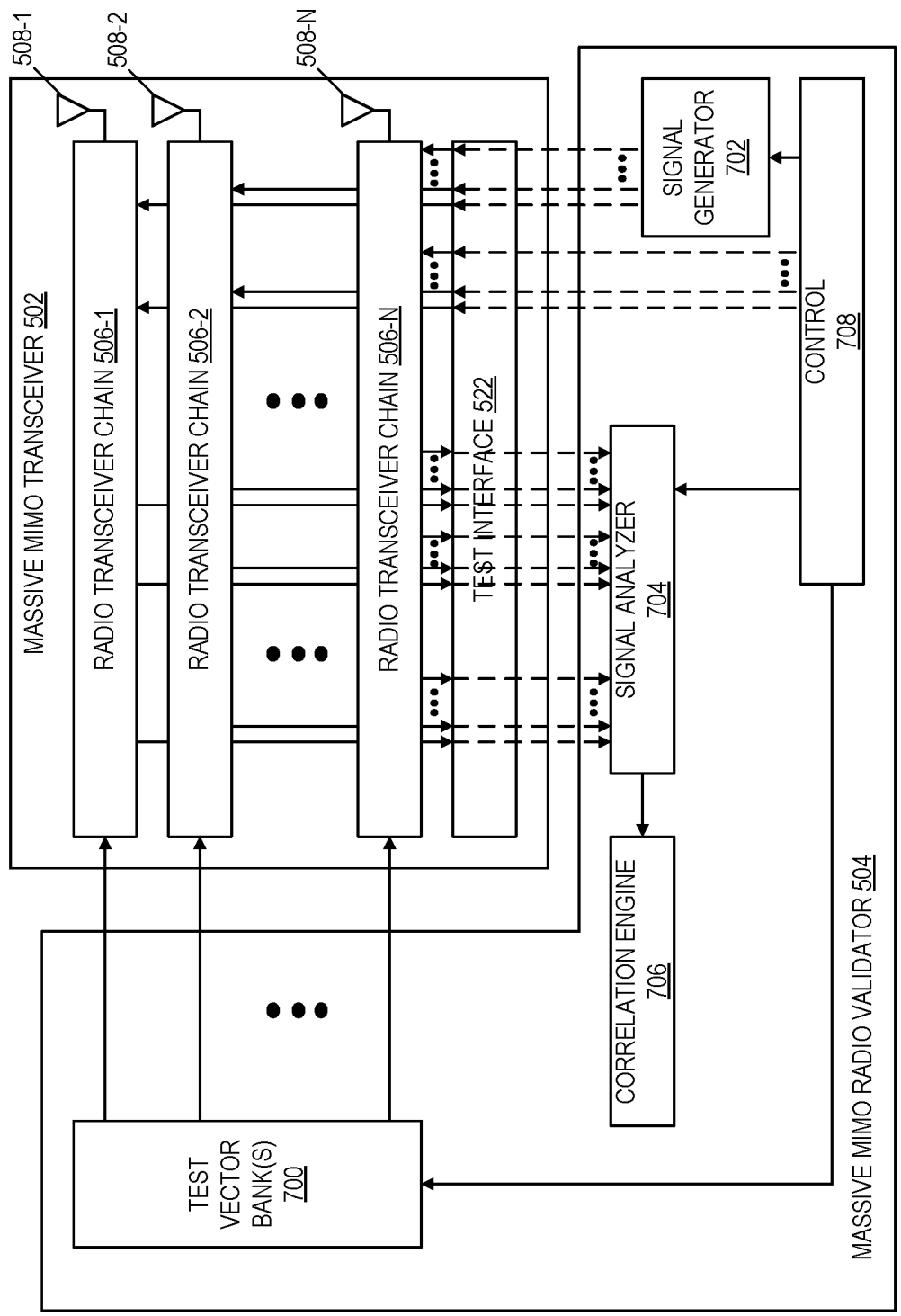
FIG. 7 illustrates the massive MIMO radio validator of the radio system of FIG. 5 in more detail according to some embodiments of the present disclosure.

FIG. 7 illustrates the massive MIMO radio validator 504 in more detail according to some embodiments of the present disclosure. As illustrated, the massive MIMO radio validator 504 includes a test vector bank 700 that stores one or more test signal vectors that are input to the radio transceiver chains 506 during testing, a signal generator 702 that generates a signal injected into the receive paths of the radio transceiver chains 506 during testing, a signal analyzer 704 that obtains measurements from signals obtained from the test interface 522 for one or more observation points in the radio transceiver chains 506, a correlation engine 706 that compares the obtained measurements to corresponding reference values to detect the health of the massive MIMO transceiver 502, and a controller 708 that provides control for the testing of the massive MIMO transceiver 502. For instance, the controller 708 controls the various components of the massive MIMO radio validator 504 and the switching circuitry 520 of the radio transceiver chains 506 to obtain the reference measurements and to perform monitoring of the massive MIMO transceiver 502 as described herein.

Figure 8:
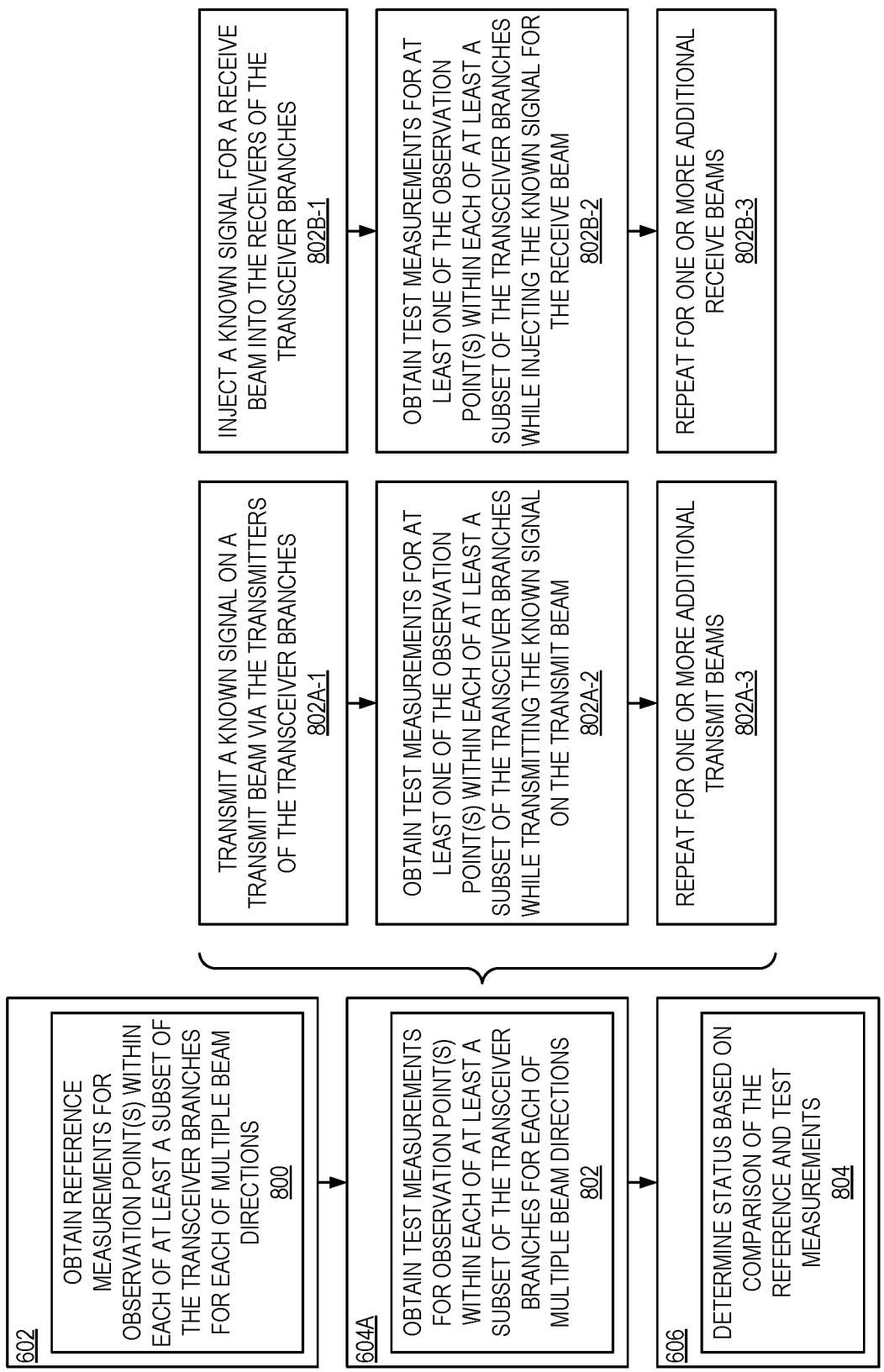
FIG. 8 illustrates steps 602 through 606 of FIG. 6 in more detail in accordance with some embodiments of the present disclosure.

FIG. 8 illustrates steps 602 through 606 of FIG. 6 in more detail in accordance with some embodiments of the present disclosure. This discussion is particularly directed to embodiments in which internal component based supervision is performed; however, a similar process may be performed for over-the-air based supervision. As illustrated, in order to obtain the first measurements that are stored as the reference values, the massive MIMO radio validator 504 obtains reference measurements for one or more observation points within each of at least a subset of the radio transceiver chains 506 of the massive MIMO transceiver 502 for each of multiple transmit and/or receive beam directions (step 800). These reference values are stored locally at the radio system 500 and/or stored remotely. Alternatively, the reference values are general reference values stored at the radio system 500 or obtained from another node. In other words, step 800 may not be performed in some embodiments; rather, the reference values are general reference values that are stored at the radio node 500, e.g., during manufacturing or obtained from another node.

In order to perform continuous internal component based supervision of the massive MIMO transceiver 502 during operation, the massive MIMO radio validator 504 obtains test measurements for the one or more observation points within each of the at least a subset of the radio transceiver chains 506 of the massive MIMO transceiver 502 for each of the multiple transmit and/or receive beam directions (step 802).

More specifically, in some embodiments, the massive MIMO radio validator 504 transmits a known test signal on a transmit beam via the transmit paths of the radio transceiver chains 506 (step 802A-1). In some embodiments, the known signal transmitted on the transmit beam is the same as that transmitted via the transmit paths of the radio transceiver chains 506 while obtaining the respective reference measurements for the transmit beam, or a derivative thereof. While transmitting this known test signal, the massive MIMO radio validator 504 obtains a test measurement(s) for at least one observation point in each of at least a subset of the radio transceiver chains 506 (step 802A-2). The massive MIMO radio validator 504 repeats steps 802A-1 and 802A-2 for one or more additional transmit beam directions (step 802A-3).

In some embodiments, the massive MIMO radio validator 504 injects a known test signal on a receive beam via the receive paths of the radio transceiver chains 506 (step 802B-1). In some embodiments, the known signal injected on the receive beam is the same as that injected into the receiver paths of the radio transceiver chains 506 while obtaining the respective reference measurements for the receive beam, or a derivative thereof. While injecting this known test signal, the massive MIMO radio validator 504 obtains a test measurement(s) for at least one observation point in each of at least a subset of the radio transceiver chains 506 (step 802B-2). The massive MIMO radio validator 504 repeats steps 802B-1 and 802B-2 for one or more additional receive beam directions (step 802B-3).

The massive MIMO radio validator 504 then determines the health of the massive MIMO transceiver 502 based on a comparison of the test measurements and the corresponding reference measurements (step 804), as described above.

Figure 9:
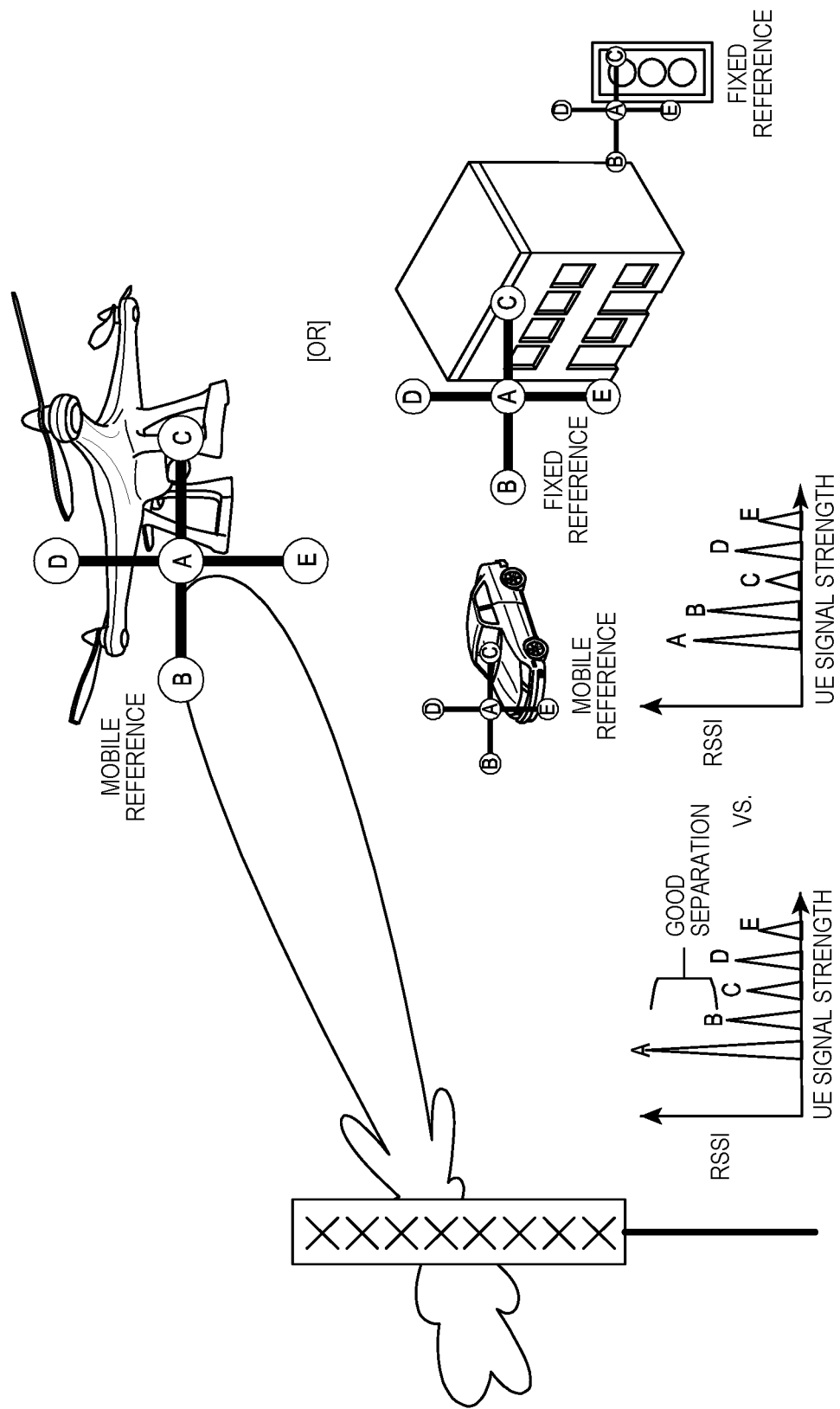
FIG. 9 illustrates one example of non-network-assisted over-the-air based supervision.

FIGS. 9 through 16 provide additional details for example embodiments of over-the-air based supervision. In particular, FIG. 9 illustrates one example of a non-network-assisted over-the-air based supervision of the massive MIMO transceiver 502 of the radio system 500 where, in this example, the radio system 500 is again a radio access node in which the massive MIMO transceiver 502 is implemented in a radio unit of the radio access node and the massive MIMO radio validator 504 is implemented in a digital unit of the radio access node. In this example, non-network-assisted over-the-air supervision is performed to obtain information that is indicative of a beam directivity of the massive MIMO transceiver 502. In other words, information is obtained that is indicative of the main lobe width ($\phi$). Main lobe width is the selectivity of the main lobe transmission measured as the degree azimuth spread across the main lobe. As illustrated, multiple wireless devices (referred to as UEs A, B, C, D, and E) are mounted on a stationary or mobile test structure. In this example, the wireless devices operate signal generators. In operation, UEs A, B, C, D, and E each transmit a signal (e.g., Sounding Reference Signal (SRS)) preferably at the same transmit power. The radio access node, and in particular the radio system 500 of the radio access node, measures a received power for each of the signals. Initially, this may be done to obtain reference measurements, as described above. Subsequently, in some embodiments, these measurements are repeated and compared to the reference measurements to monitor the health of the massive MIMO transceiver 502 of the radio access node. For example, if the reference measurements show that the receive power of UE A should be substantially greater than that from each of the other UEs but the test measurements show that the receive power of UE A is not substantially greater than that from each of the other UEs, then the health of the massive MIMO transceiver 502 is determined to be non-healthy. Note that, as used herein, "receive power" and "receive power measurement" refer to any type of measurement that is a function of the receive power (e.g., actual receive power, received signal strength, Signal to Interference plus Noise Ratio (SINR), or the like). Alternatively, there may be no reference measurements, and the receive beam is known to be directed at UE A. If the massive MIMO transceiver 502 has good directivity, the signal from UE A is expected to be the strongest signal received assuming that all of the UEs transmit at the same calibrated power level. This is shown as the left sub-diagram. However, if the antenna directivity towards UE A is not as expected, the other UEs will also be seen to have strong signals also. In other words, the signal isolation coming from antenna directivity may require further investigation. This is an indication of a non-healthy status of the massive MIMO transceiver 502.

Note that FIG. 9 illustrates both stationary test structures (e.g., test structures affixed to a building or street light) and mobile test structures (e.g., test structures affixed to a drone or automobile). The mobile test structure can be affixed to a drone (or multiple drones) with known Global Positioning System (GPS) coordinates. The mobile test structure may also be affixed to a road test vehicle. Periodic measurements can be conducted over time using the mobile and/or stationary test structures to confirm environmental changes are captured.

The use of test structures simultaneously can also be possible and not exclusive. For example, if the antenna beam is formed towards the test structure affixed to the roof of the building, the massive MIMO transceiver 502 may also detect signals transmitted by the wireless devices mounted on the test structure affixed to the nearby street light. This additional data may be used to help measure the main lobe width.

Figure 10:
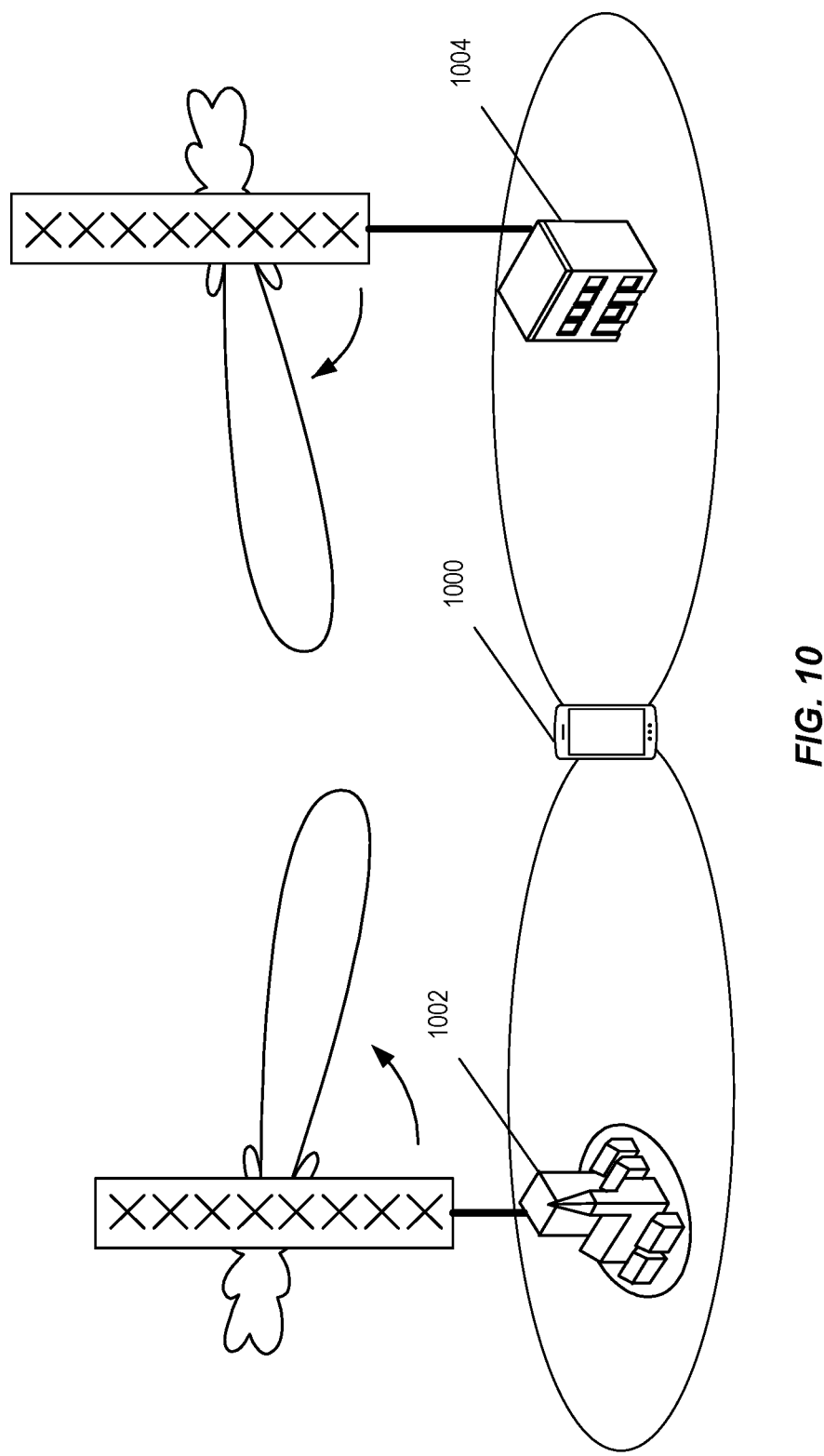
FIG. 10 illustrates a variation in which a wireless device at a cell edge is utilized for over-the-air based supervision.

A variation can make use of a wireless device 1000 at the cell edge, as illustrated in FIG. 10. In some embodiments, a dedicated wireless device 1000 is carefully placed at the cell edge between two or more radio access nodes 1002 and 1004 that are simultaneously connected to the wireless device 1000. The radio access nodes 1002 and 1004, which can each include the radio system 500 of FIG. 5, listen to a beacon transmitted by the wireless device 1000. If one radio access node 1002 suddenly receives the beacon with a weaker signal strength as compared to a reference measurement but the other radio access node(s) 1004 do not, the health of the massive MIMO transceiver 502 of that radio access node 1002 may be determined to be non-healthy. The wireless device 1000 transmitting the beacon can be an ordinary UE or a special transmitter that transmits during a downlink subframe of a Time Division Duplexing (TDD) network. Since the uplink is not used for traffic, and it can be available for calibration. In other words, the downlink of the radio access node 1002, 1004 forms a beam towards a UE 1000 in service. The radio access node 1002, 1004 controls the scheduler and can free up a group of subcarriers. This is a downlink subframe, and the receiver chain of the transceiver is free for use. A special UE 1000 can transmit in contrast to an ordinary listening UE. Note that, when a subcarrier is unused, there is no interference. The receiver chain performs the calibration. Since there are observation point(s) at the antenna, these subcarriers can be extracted by filtering. In some embodiments, when the massive MIMO transceiver 502 is healthy, the cell edge may be re-defined based on the beacon signal from the wireless device.

Figure 11:
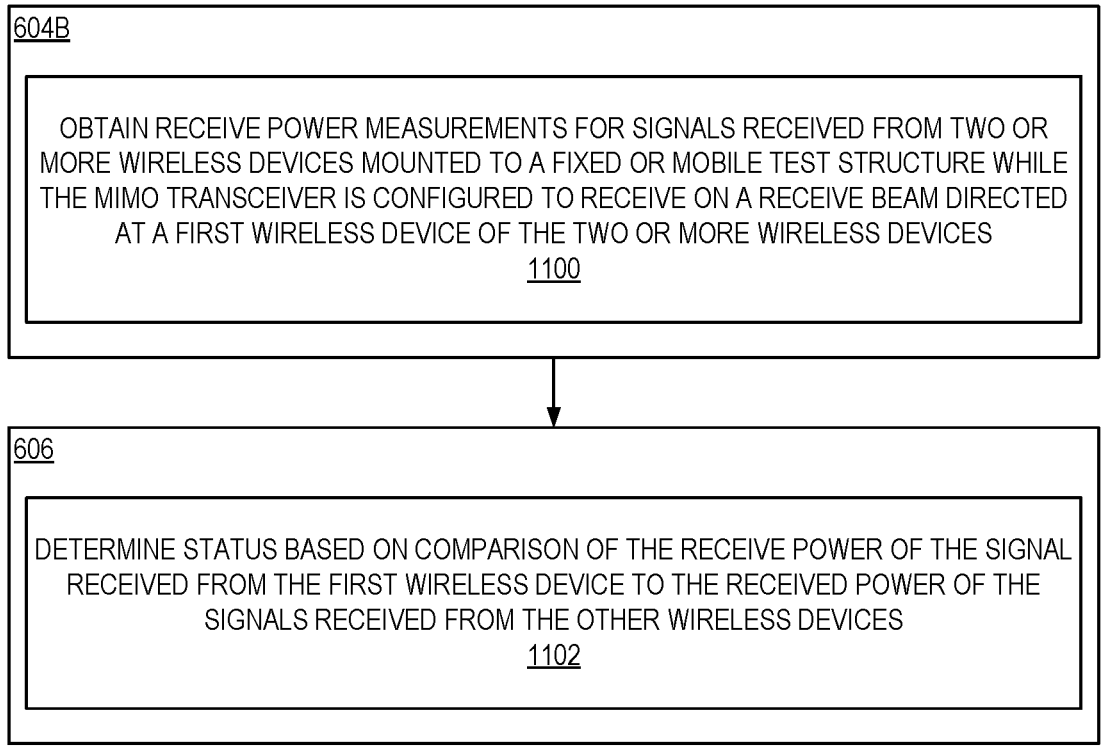
FIG. 11 is a flow chart that illustrates steps 604B and 606 of FIG. 6 in more detail in accordance with an example embodiment of non-network assisted over-the-air supervision.

FIG. 11 is a flow chart that illustrates steps 604B and 606 of FIG. 6 in more detail in accordance with an example embodiment of non-network assisted over-the-air supervision. As illustrated, the massive MIMO radio validator 504 obtains receive power measurements for signals received from two or more wireless devices fixed to a stationary or mobile test structure while the massive MIMO transceiver 502 is configured to receive on a receive beam directed to a first wireless device of the two or more wireless devices (step 1100). The massive MIMO radio validator 504 determines the status, or health, of the massive MIMO transceiver 502 based a comparison of the receive power for the signal received from the first wireless device and the received power for the signal received from each of the other wireless devices (step 1102), as described above.

Figure 12:
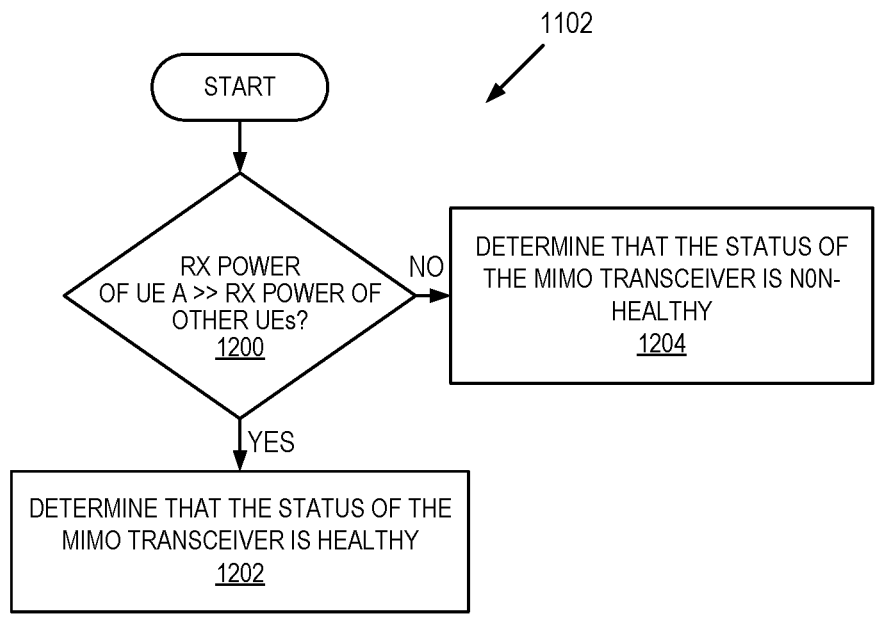
FIG. 12 illustrates step 1102 of FIG. 11 in more detail according to some example embodiments.

FIG. 12 illustrates step 1102 of FIG. 11 in more detail according to some example embodiments. As illustrated, the massive MIMO radio validator 504 determines whether the received power for the signal received from the first wireless device (referred to here as UE A) is much greater than that of the signals received from the other wireless devices in the test structure (step 1200). Note that, in some embodiments, wireless devices for which the measurements of receive power are performed all transmit at the same transmit power. However, in other embodiments, the wireless devices may transmit at different transmit powers, and the receiver power measurements are normalized receiver power measurements (i.e., receiver power measurements that are normalized with respect to transmit power). Here, the received power for the signal received from the first wireless device is much greater than that of the signals received from the other wireless devices if it is greater than the received power of the signals from the other wireless devices by a predetermined amount. This predetermined amount may be determined based on reference measurements for the received power of the signals from the same wireless devices. If so, the massive MIMO radio validator 504 determines that the massive MIMO transceiver 502 is healthy (step 1202). Otherwise, the massive MIMO radio validator 504 determines that the massive MIMO transceiver 502 is non-healthy (step 1204). Note that, if the massive MIMO transceiver 502 is determined to be non-healthy, the massive MIMO radio validator 504, an operator, or some other system component may further investigate to determine whether the non-healthy status is due to, e.g., a hardware fault in the massive MIMO transceiver 502 or due to environmental conditions. Environmental conditions may be checked in person by an operator or by dedicated equipment such as, e.g., a post-mounted camera.

Figure 13:
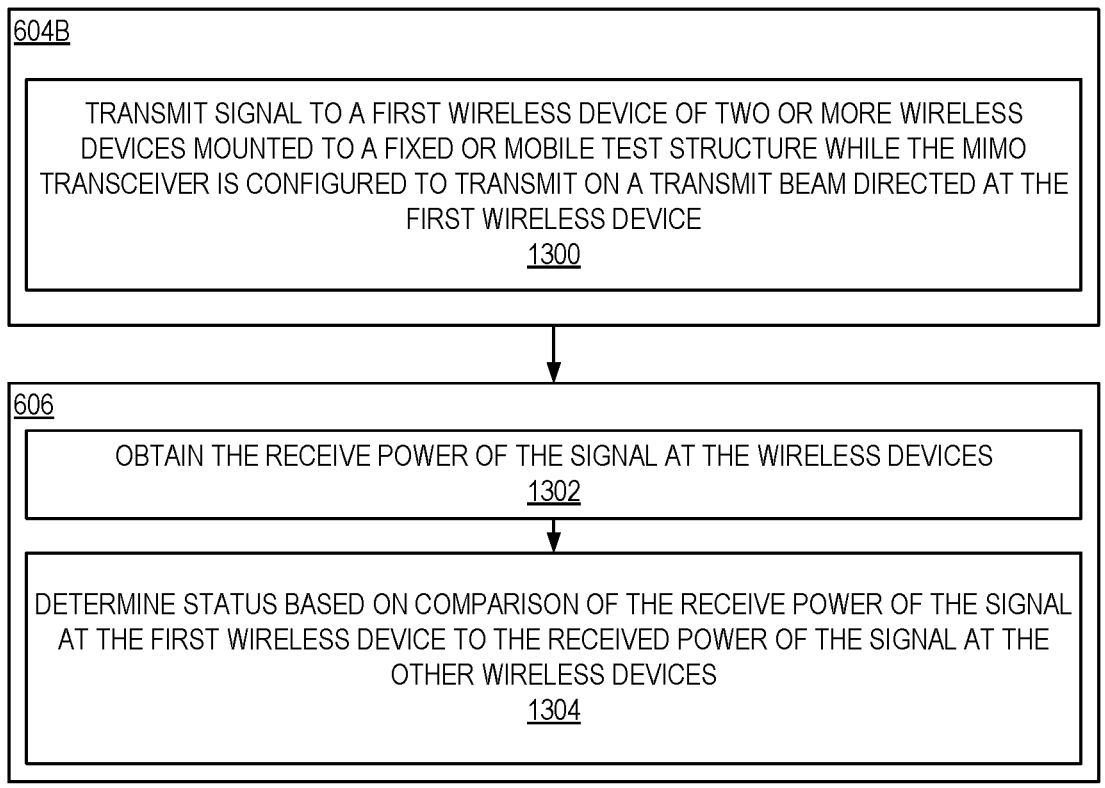
FIG. 13 is a flow chart that illustrates steps 604B and 606 of FIG. 6 in more detail in accordance with another example embodiment of non-network assisted over-the-air supervision.

FIG. 13 is a flow chart that illustrates steps 604B and 606 of FIG. 6 in more detail in accordance with another example embodiment of non-network assisted over-the-air supervision. As illustrated, the massive MIMO radio validator 504 transmits a signal to a first wireless device of two or more wireless devices fixed to a stationary or mobile test structure while the massive MIMO transceiver 502 is configured to transmit on a transmit beam directed to the first wireless device (step 1300). The massive MIMO radio validator 504 obtains (e.g., from the wireless devices) measurements of the received power of the signal at each of the wireless devices in the test structure (step 1302). The massive MIMO radio validator 504 then determines the status, or health, of the massive MIMO transceiver 502 based a comparison of the receive power for the signal at the first wireless device and the received power for the signal at each of the other wireless devices (step 1304).

Figure 14:
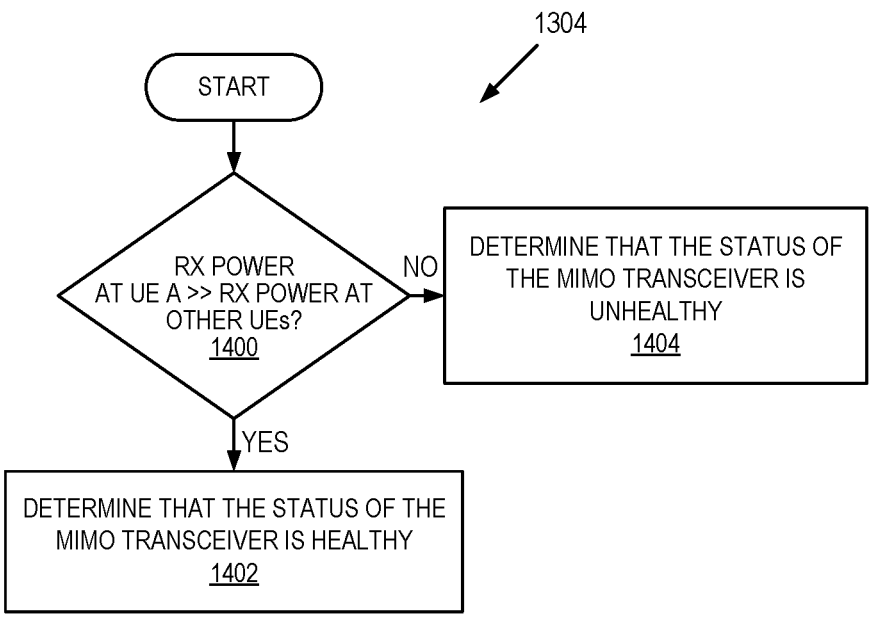
FIG. 14 illustrates step 1304 of FIG. 13 in more detail according to some example embodiments.

FIG. 14 illustrates step 1304 of FIG. 13 in more detail according to some example embodiments. As illustrated, the massive MIMO radio validator 504 determines whether the received power for the signal at the first wireless device (referred to here as UE A) is much greater than that at the other wireless devices in the test structure (step 1400). Here, the received power for the signal at the first wireless device is much greater than that at the other wireless devices if it is greater than the received power at the other wireless devices by a predetermined amount. This predetermined amount may be determined based on reference measurements for the received power of the signal at the same wireless devices. If so, the massive MIMO radio validator 504 determines that the massive MIMO transceiver 502 is healthy (step 1402). Otherwise, the massive MIMO radio validator 504 determines that the massive MIMO transceiver 502 is non-healthy (step 1404).

Figure 15:
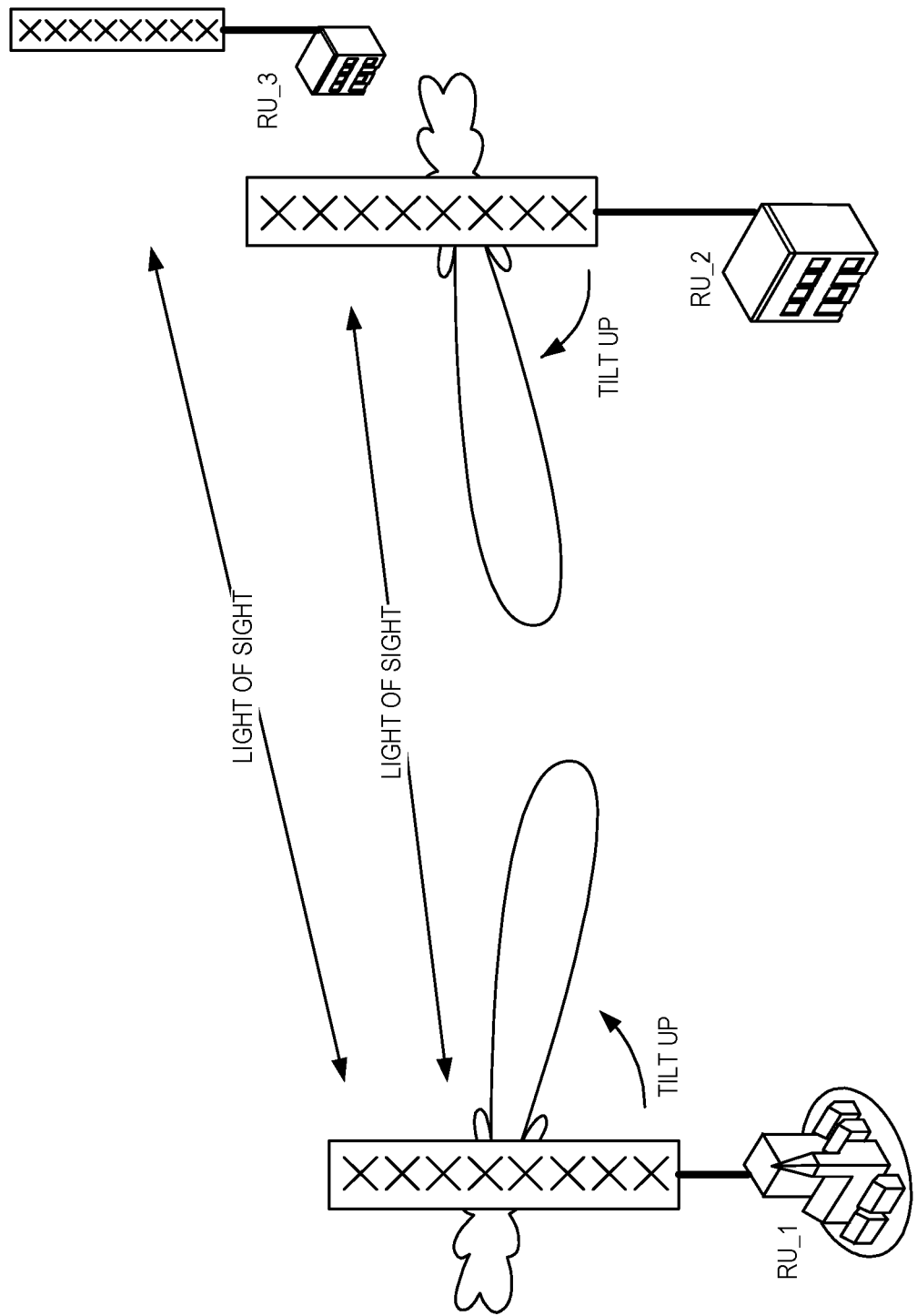
FIG. 15 illustrates one example of network-assisted over-the-air supervision in accordance with some embodiments of the present disclosure.

FIG. 15 illustrates one example of network-assisted over-the-air supervision in accordance with some embodiments of the present disclosure. In this example, the radio system 500 is implemented in a radio unit (RU_1) of a radio access node. Network-assisted over-the-air supervision may be performed as follows. RU_1 is in testing mode (quiet time), and RU_2, which is a radio unit of a neighboring radio access node, is also in testing mode. RU_1 is configured to tilt its digital downlink beams directly towards RU_2, in contrast to tilting down to avoid interference to each other. The receive beams of RU_2 are titled to receive test signals transmitted by RU_1 with its Uplink Spectrum Analyzer (ULSA) turned on. At the radio access node in which RU_2 is implemented, the received signals are used to detect whether there are any obstacles that impair the downlink beam shape of RU_1 or whether there is any problem with the RU_1 antenna branches that results in distortion the beam from RU_1. For example, a massive MIMO radio validator 504 associated with RU_2 compares a measurement(s) on the received test signal(s) from RU_1 against a corresponding reference value(s). If the measurement(s) differ from the reference value(s) by more than a predefined threshold amount, then an error is detected. RU_2 sends an indication of whether an error is detected to RU_1, where the indication is processed by the massive MIMO radio validator 504 associated with the RU_1. Alternatively, RU_2 may send the measurement value(s) back to RU_1 or the massive MIMO radio validator 504 associated with RU_1, e.g., via an interface between the two radio access nodes. The massive MIMO radio validator 504 associated with RU_1 then determines whether there is an error with the massive MIMO transceiver 502 of RU_1 by, e.g., comparing the measurement value(s) with corresponding reference value(s). In either case, if an error is detected, in some embodiments, RU_1 performs the same procedure with RU_3, which is the radio unit of another neighboring radio access node. If the error persists, the massive MIMO radio validator 504 of RU_1 takes one or more actions in an attempt to correct the error, as discussed above.

Further improvement can be performed on the base algorithm. If both AASs are in line-of-sight of each other without adjusting the antenna tilt, the calibration beam can be created to point to each other while the radio access nodes continue to provide service. This validation while in service gives an instantaneous confirmation that the network is operating as planned. This can be accomplished in several ways. As one example, a beam is formed on a dedicated radio resource block. This is the same as forming a beam to a wireless device. In this case, both the scheduler and digital beam forming are involved. This approach also impacts the capacity of the existing cell. As another example, a dedicated narrow band cell which shares the antenna element can be used. With the introduction of NB-IoT, a cell can be formed in the guardband of the carrier. Doing so does not impact existing cell configuration and resources.

Figure 16:
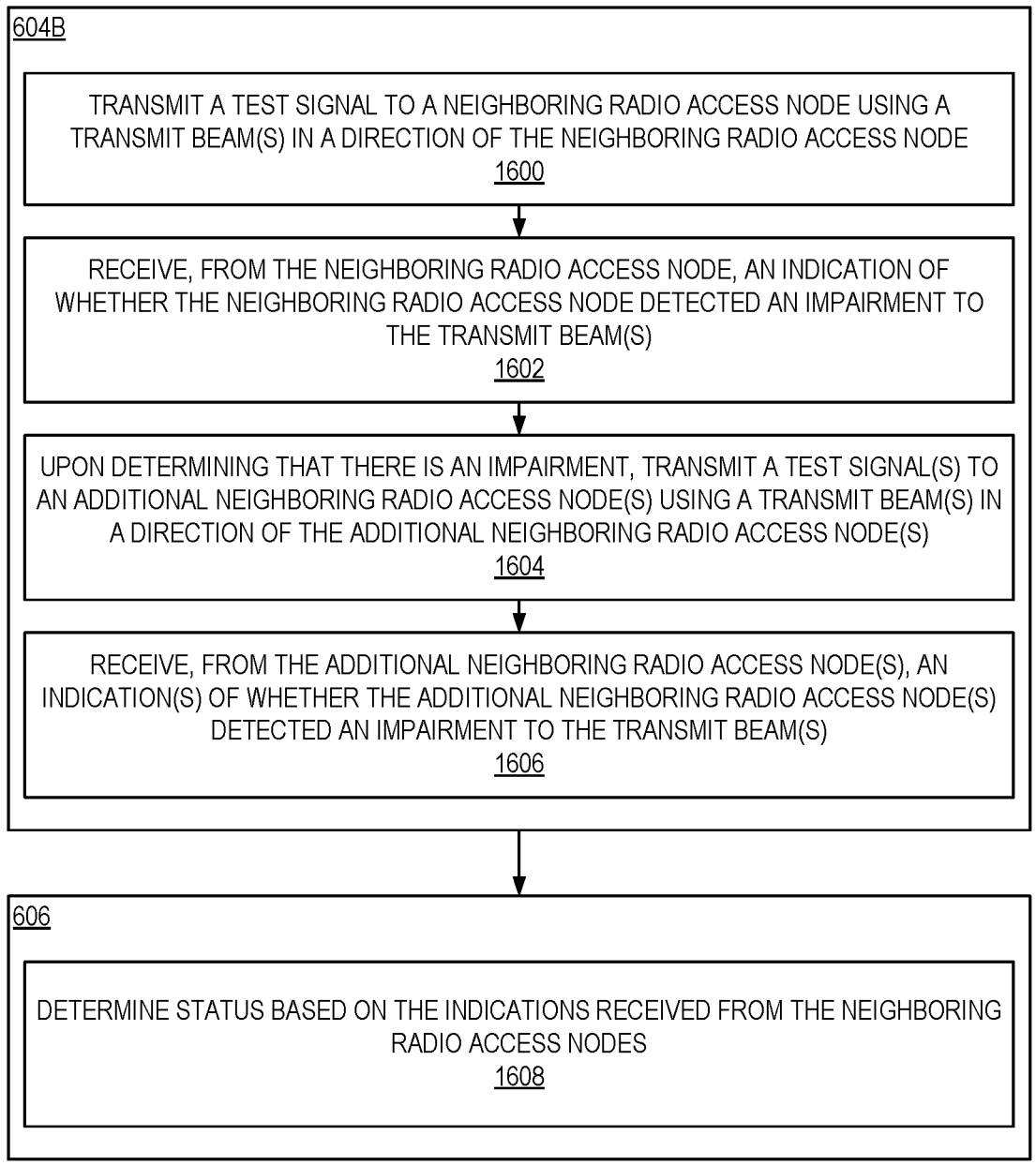
FIG. 16 is a flow chart that illustrates the operation of the massive MIMO radio validator to perform network-assisted over-the-air supervision in accordance with some embodiments of the present disclosure.

FIG. 16 is a flow chart that illustrates the operation of the massive MIMO radio validator 504 to perform network-assisted over-the-air supervision in accordance with some embodiments of the present disclosure. This process illustrates steps 604B and 606 of FIG. 6 in more detail in accordance with some embodiments. As illustrated, the massive MIMO radio validator 504 transmits a test signal via the massive MIMO transceiver 502 to a neighboring radio access node using a transmit beam(s) in a direction of the neighboring radio access node (step 1600). The massive MIMO radio validator 504 receives, from the neighboring radio access node, an indication of whether the neighboring radio access node detected an impairment to the transmit beam(s) (step 1602). Upon determining that there is an impairment, the massive MIMO radio validator 504 transmits a test signal(s) to an additional neighboring radio access node(s) using a transmit beam(s) in a direction of the additional neighboring radio access node(s) (step 1604). The massive MIMO radio validator 504 receives, from the additional neighboring radio access node(s), an indication(s) of whether the additional neighboring radio access node(s) detected an impairment (step 1606). Then, based on the information collected in steps 1600 through 1606, the massive MIMO radio validator 504 determines the status, or health, of the massive MIMO transceiver 502 (step 1608).

Figure 17:
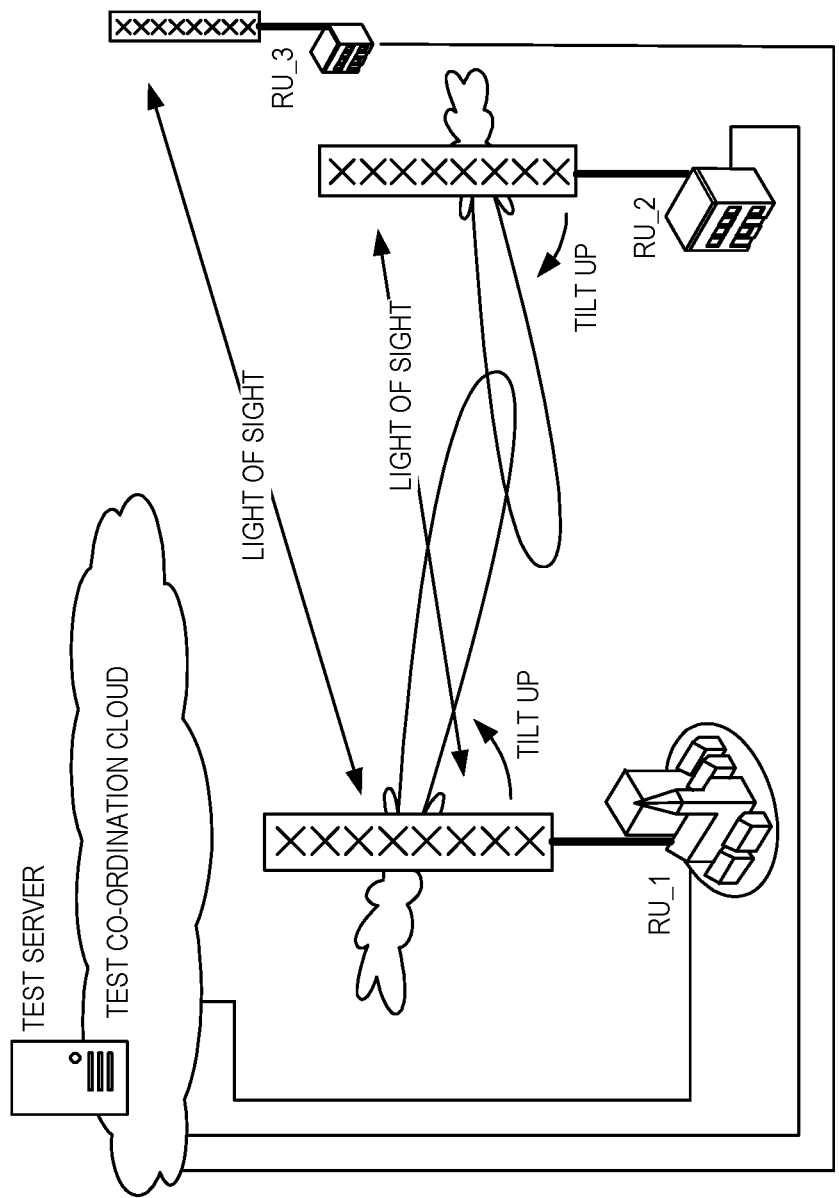
FIG. 17 illustrates one example of a cloud infrastructure that can be used to implement aspects of the present disclosure in accordance with some embodiments of the present disclosure.

FIG. 17 illustrates one example of a cloud infrastructure that can be used to implement aspects of the present disclosure in accordance with some embodiments of the present disclosure. The cloud infrastructure enables a radio access node in which the radio system 500 is implemented to avoid isolation and to work cooperatively with other radio access nodes. Some example features that may be provided by the cloud infrastructure include:

Storage of the Radio Component Based Supervision: In some embodiments, results of the internal radio component based supervision (e.g., reference measurements and/or test measurements and/or indication of the detected health for the massive MIMO transceivers 502 of many radio access nodes) may be stored in a centralized location, e.g., at a centralized test server. A centralized statistic report can be extracted from this information.

The centralized test server may operate as a main coordinator of the network-assisted over-the-air supervision for multiple radio access nodes.

The test server may operate as a validator of the non-network assisted external over-the-air supervision framework. For example, when more than one radio access node does not detect the beacon signal from the wireless device(s) mounted on a stationary test structure, the test server can determine that it is likely the wireless device(s) are the source of the fault, and not the massive MIMO transceivers 502 of the radio access nodes.

Test Signal Considerations: In the many embodiments described herein, test signals are used to perform both internal radio component based supervision and external over-the-air based supervision of the health of the massive MIMO transceiver 502. The test signal(s) used by this over-the-air method can be a 3GPP or other specific signal following the standard protocol, or customized protocol, or it can be a special signal dedicated for supervision and calibration purpose.

With a UE-like external device for measurement, there are several ways of utilizing baseband signals and protocols to assist the supervision by measurement and monitoring. Some examples are:

Using native 3GPP or other specific air interface signal(s) with standard protocol as the test signal(s).

Using, as the test signal(s), a native air interface signal(s) with a proprietary protocol that is customized for AAS supervision by measurement and monitoring.

Using a customized air interface signal(s) and protocol for the test signal(s) for AAS supervision by measurement and monitoring.

One common aspect of these examples is that the baseband Digital Unit (DU) of the radio access node creates a special scheduling scheme to treat the UE-like measurement device as one of the UEs, but in a way such that the measurement and monitoring goal can be achieved. For example, the baseband unit can generate a sweeping signal along its horizontal plane and vertical plane to detect if there is any obstacle appeared in the last detection period. As one of the options, the transmitted signals and scheduling scheme are pre-designed and known at both the radio access node and UE-like measurement device such that the UE-like measurement device knows what kind of signal it is expected to receive. As another of option, the transmitted signals and scheduling scheme are dynamically generated and signaled to the UE-like measurement device such that the radio access node could adjust the supervision state based on the changing situation and diagnose unusual behavior of the AAS under supervision. As yet another option, the radio access node and UE-like measurement device could exchange information using the established communication link and the content of the information could be used to facilitate functional operation of AAS supervision.

In some embodiments, an uplink channel(s) from the UE-like measurement device can be used for feedback of the results and observations such that the massive MIMO radio validator 504 can adjust the supervision strategy dynamically. It could be a scan through predefined test cases repeatedly or trigger special measurement event in case un-normal behavior is observed.

Other than using a UE-like measurement device which is dedicated for AAS supervision purpose, the radio access node can also schedule regular wireless devices (e.g., regular UEs) in the coverage area to assist with AAS supervision. One such option could be regular wireless devices in the coverage area configured with special reference signals (e.g., Channel State Information Reference Signal (CSI-RS)) and feedback channel state information (CSI), including receive power measurement, which could assist AAS supervision instead of for data transmission to the wireless devices. The aforementioned cell edge detection can use a regular subscriber UE or a specialized UE.

As discussed above, legacy (passive) antenna systems are manufactured and packaged with one or a few connectors which are accessible for connecting with a radio transceiver and for testing. In 5G, massive MIMO AAS substantially increases the number of physical antenna ports for digital beamforming as required by the mobile system specification. Beamforming verification requires measuring from these antenna ports collectively, in contrast to independent measurement as before.

Thus, massive MIMO is a new challenge and requires evolution of existing solutions. Embodiments of the present disclosure relate to enchantments of conventional component based validation and additionally provides over-the-air validation. Embodiments of the present disclosure address scalability and densification challenges. In particular, the digital baseband unit of a radio access node includes a new function (i.e., the massive MIMO radio validator 504) that performs periodic validation of the massive MIMO transceiver 502. In some embodiments, the massive MIMO radio validator 504 injects a test vector into the massive MIMO transceiver 502 in conjunction with component based validation. Measurements from the internal observation points are collected and analyzed by the massive MIMO radio validator 504 for functional integrity testing. Embodiments of the present disclosure also address the need for continuous supervision. In some embodiments, the internal component based supervision is performed periodically such that, e.g., any software or hardware component degradation trend can be detected early. Further, in some embodiments, external over-the-air supervision is performed to discover environmental degradation such as an obstruction due to, e.g., a new building or fallen trees. The over-the-air supervision uses a mobile wireless device(s), a fixed mounted wireless device(s), or another radio access node(s) to generate or detect a test signal (e.g., a reference signal) so that any sudden radio frequency path degradation can be detected early.

Figure 18:
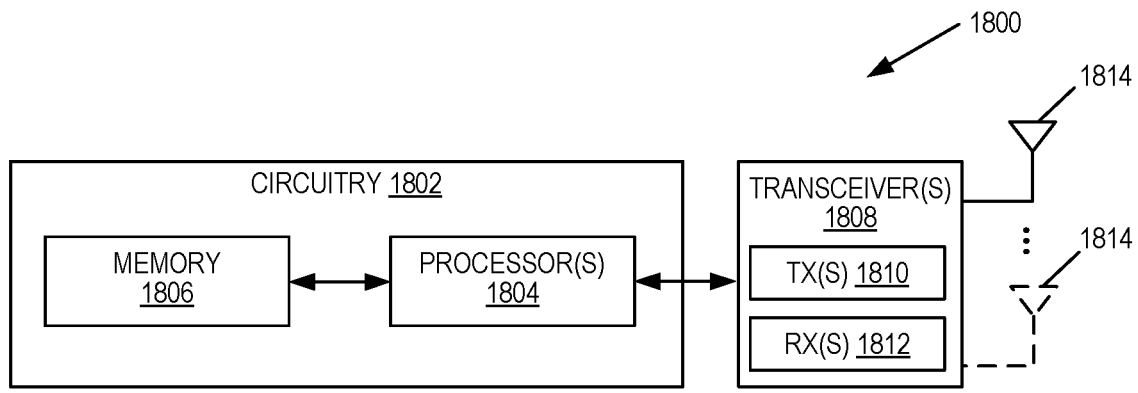
FIGS. 18 and 19 illustrate example embodiments of a wireless device.

FIG. 18 is a schematic block diagram of a wireless device 1800 (e.g., a UE) according to some embodiments of the present disclosure. As illustrated, the wireless device 1800 includes circuitry 1802 comprising one or more processors 1804 (e.g., Central Processing Units (CPUs), ASICs, FPGAs, DSPs, and/or the like) and memory 1806. The wireless device 1800 also includes one or more transceivers 1808 each including one or more transmitters 1810 and one or more receivers 1812 coupled to one or more antennas 1814. In some embodiments, the functionality of the wireless device 1800 described herein may be implemented in hardware (e.g., via hardware within the circuitry 1802 and/or within the processor(s) 1804) or be implemented in a combination of hardware and software (e.g., fully or partially implemented in software that is, e.g., stored in the memory 1806 and executed by the processor(s) 1804).

In some embodiments, a computer program including instructions which, when executed by the at least one processor 1804, causes the at least one processor 1804 to carry out at least some of the functionality of the wireless device 1800 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 19:
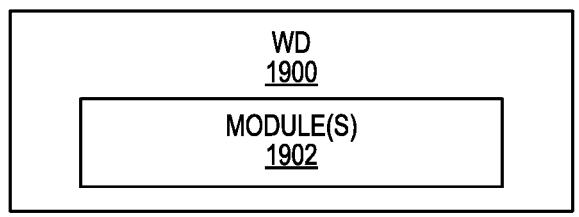

FIG. 19 is a schematic block diagram of a wireless device 1900 (e.g., a UE) according to some other embodiments of the present disclosure. The wireless device 1900 includes one or more modules 1902, each of which is implemented in software. The module(s) 1902 provide the functionality of the wireless device 1900 described herein.

Figure 20:
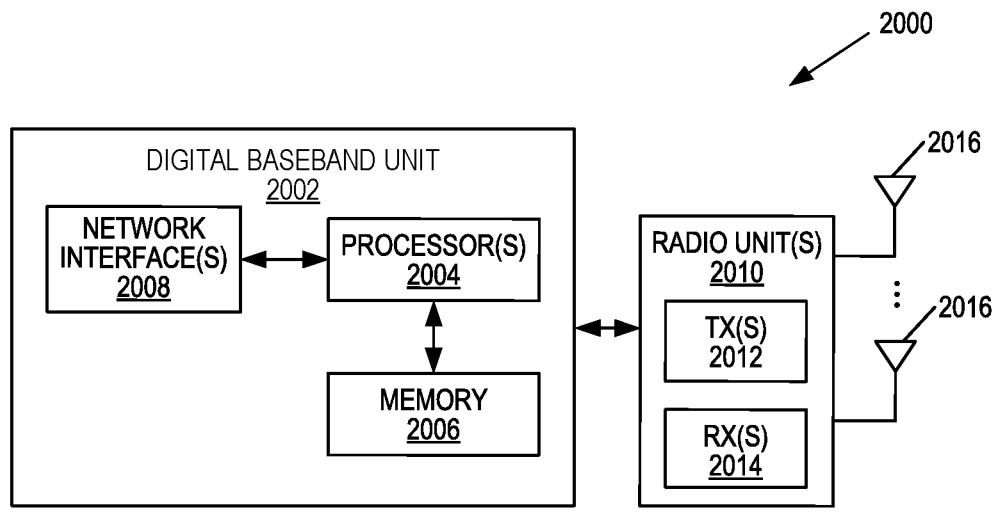
FIGS. 20 and 22 illustrate example embodiments of a network node.

FIG. 20 is a schematic block diagram of a radio access node 2000 (e.g., an eNB or gNB) according to some embodiments of the present disclosure. As illustrated, the radio access node 2000 includes a digital baseband unit 2002 that includes circuitry comprising one or more processors 2004 (e.g., CPUs, ASICs, DSPs, FPGAs, and/or the like) and memory 2006. The digital baseband unit 2002 also includes a network interface 2008. The radio access node 2000 also includes one or more radio units 2010 that each include one or more transmitters 2012 and one or more receivers 2014 coupled to one or more antennas 2016. In some embodiments, the massive MIMO radio validator 504 is implemented in the digital baseband unit 2002, and the massive MIMO transceiver 502 is implemented in the radio unit(s) 2010. The functionality of the massive MIMO radio validator 504 may be implemented as hardware or a combination of hardware and software in the digital baseband unit 2002. Some or all of the functionality of the massive MIMO radio validator 504 may be implemented in software that is, e.g., stored in the memory 2006 and executed by the processor(s) 2004.

Figure 21:
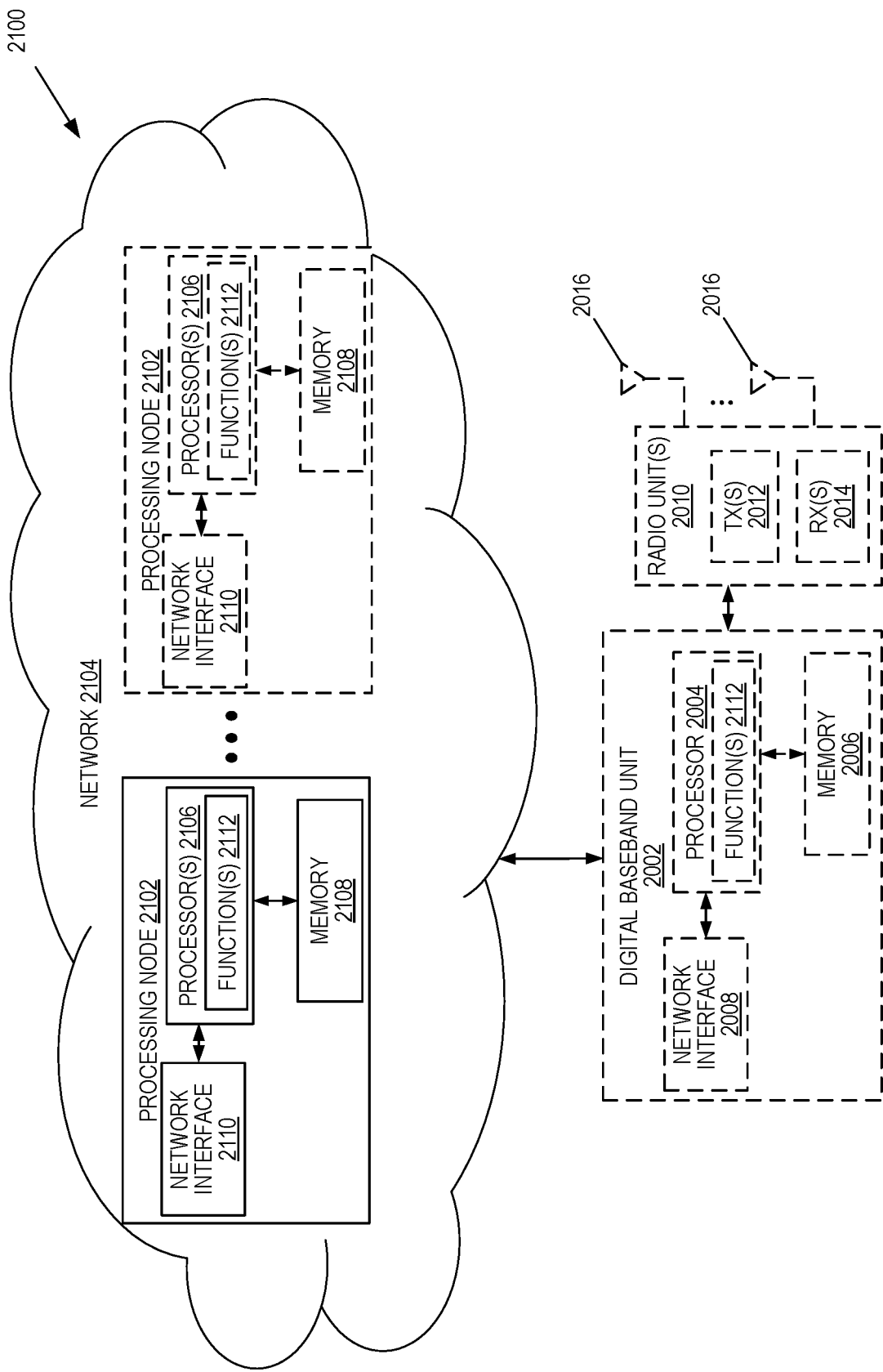
FIG. 21 is a schematic block diagram illustrating a virtualization environment in which functions implemented by some embodiments may be virtualized.

FIG. 21 is a schematic block diagram that illustrates a virtualized embodiment of a radio access node 2100 according to some embodiments of the present disclosure. As used herein, a "virtualized" radio access node 2100 is a radio access node 2100 in which at least a portion of the functionality of the radio access node 2100 is implemented as a virtual component (e.g., via a virtual machine(s) executing on a physical processing node(s) in a network(s)). As illustrated, the radio access node 2100 optionally includes the digital baseband unit 2002, as described with respect to FIG. 20. In addition, the radio access node 2100 also includes the one or more radio units 2010, as described with respect to FIG. 20. The digital baseband unit 2002 (if present) is connected to one or more processing nodes 2102 coupled to or included as part of a network(s) 2104 via the network interface 2008. Alternatively, if the digital baseband unit 2002 is not present, the one or more radio units 2010 are connected to the one or more processing nodes 2102 via a network interface(s). In this embodiment, the functionality of the massive MIMO radio validator 504 is implemented at one or more of the processing nodes 2102 or distributed across one or more of the processing node 2102 and the digital baseband unit 2002. Each processing node 2102 includes one or more processors 2106 (e.g., CPUs, ASICs, DSPs, FPGAs, and/or the like), memory 2108, and a network interface 2110.

In this example, functions 2112 of the radio access node 2100 (e.g., the functions of the massive MIMO radio validator 504) described herein are implemented at the one or more processing nodes 2102 or distributed across the digital baseband unit 2002 and the one or more processing nodes 2102 in any desired manner. In some particular embodiments, some or all of the functions 2112 of the radio access node 2100 described herein are implemented as virtual components executed by one or more virtual machines implemented in a virtual environment(s) hosted by the processing node(s) 2102. As will be appreciated by one of ordinary skill in the art, additional signaling or communication between the processing node(s) 2102 and the digital baseband unit 2002 (if present) or alternatively the radio unit(s) 2010 is used in order to carry out at least some of the desired functions. Notably, in some embodiments, the digital baseband unit 2002 may not be included, in which case the radio unit(s) 2010 communicates directly with the processing node(s) 2102 via an appropriate network interface(s).

In some particular embodiments, higher layer functionality (e.g., layer 3 and up and possibly some of layer 2 of the protocol stack) of the radio access node 2100 may be implemented at the processing node(s) 2102 as virtual components (i.e., implemented "in the cloud") whereas lower layer functionality (e.g., layer 1 and possibly some of layer 2 of the protocol stack) may be implemented in the radio unit(s) 2010 and possibly the digital baseband unit 2002.

In some embodiments, a computer program including instructions which, when executed by the at least one processor 2004 and/or 2106, causes the at least one processor 2004 and/or 2106 to carry out the functionality of the radio access node 2000, 2100 or a processing node 2102 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory).

Figure 22:
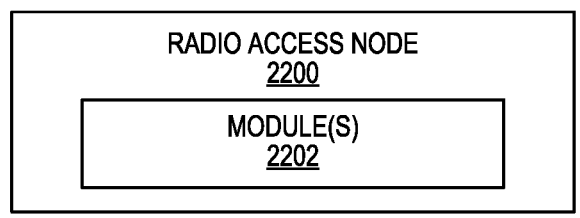

FIG. 22 is a schematic block diagram of a radio access node 2200 according to some other embodiments of the present disclosure. The radio access node 2200 includes one or more modules 2202, each of which is implemented in software. The module(s) 2202 provide the functionality of the radio access node 2200 described herein. For instance, the modules 2202 may include a calibrating module operable to perform the function of step 600 of FIG. 6, an obtaining module operable to perform the function of step 602 of FIG. 6, a monitoring module operable to perform the function of step 604 of FIG. 6, a determining module operable to perform the function of step 606 of FIG. 6, and an acting module operable to perform the functions of steps 608 through 612 of FIG. 6.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
   5G Fifth Generation
   AAS Advanced Antenna System
   AP Access Point
   ASIC Application Specific Integrated Circuit
   BSC Base Station Controller
   BTS Base Transceiver Station
   CPE Customer Premise Equipment
   CPU Central Processing Unit
   CSI-RS Channel State Information Reference Signal
   D2D Device-to-Device
   DAC Digital to Analog Converter
   DAS Distributed Antenna System
   DFE Digital Front End
   DPD Digital Predistortion
   DSP Digital Signal Processor
   DU Digital Unit
   DUT Device-Under-Test
   eNB Enhanced or Evolved Node B
   E-SMLC Evolved Serving Mobile Location Center
   FD-MIMO Full Dimension Multiple Input Multiple Output
   FPGA Field Programmable Gate Array
   gNB New Radio Base Station
   GPS Global Positioning System
   IFFT Inverse Fast Fourier Transform
   IP Internet Protocol
   LEE Laptop Embedded Equipment
   LME Laptop Mounted Equipment
   LNA Low Noise Amplifier
   LTE Long Term Evolution
   M2M Machine-to-Machine
   MCE Multi-Cell/Multicast Coordination Entity
   MDT Minimization of Drive Tests
   MIMO Multiple Input Multiple Output
   MME Mobility Management Entity
   mmW Millimeter Wave
   MSC Mobile Switching Center
   MSR Multi-Standard Radio
   MTC Machine Type Communication
   NB-IoT Narrowband Internet of Things
   NR New Radio
   O&M Operation and Maintenance
   OFDM Orthogonal Frequency Division Multiplexing
   OSS Operations Support System
   PDA Personal Digital Assistant
   P-GW Packet Data Network Gateway
   P/S Parallel to Serial
   Rel Release
   RF Radio Frequency
   RNC Radio Network Controller
   RRH Remote Radio Head
   RRU Remote Radio Unit
   SCEF Service Capability Exposure Function
   SINR Signal to Interference Plus Noise Ratio
   SON Self-Organizing Network
   SRS Sounding Reference Signal
   TDD Time Division Duplexing
   TOR Transmit Observation Receiver
   UE User Equipment
   ULSA Uplink Spectrum Analyzer
   V2I Vehicle-to-Infrastructure
   V2V Vehicle-to-Vehicle
   V2X Vehicle-to-Everything
   VoIP Voice over Internet Protocol Those skilled in the art will recognize improvements and modifications to the embodiments of the present disclosure. All such improvements and modifications are considered within the scope of the concepts disclosed herein.

What is claimed is:

1. A method of operation of a radio system to perform supervision of a Multiple Input Multiple Output, MIMO, transceiver of the radio system, comprising:
   performing continuous over-the-air based supervision of the MIMO transceiver of the radio system;
   determining a status of the MIMO transceiver based on results of performing continuous over-the-air based supervision of the MIMO transceiver of the radio system; and
   taking an action based on the status of the MIMO transceiver;
   wherein performing continuous over-the-air supervision of the MIMO transceiver of the radio system comprises one of the group consisting of:
   performing continuous over-the-air supervision of beam directivity and/or beam shape of the MIMO transceiver of the radio system;
   performing continuous over-the-air supervision of one or more factors that impact beam directivity and/or beam shape of the MIMO transceiver of the radio system;
   performing continuous non-network-assisted over-the-air based supervision of the MIMO transceiver of the radio system; and
   performing continuous network-assisted over-the-air based supervision of the MIMO transceiver of the radio system.

2. The method of claim 1 wherein performing continuous over-the-air supervision of the MIMO transceiver of the radio system comprises performing continuous over-the-air supervision of beam directivity and/or beam shape of the MIMO transceiver of the radio system.

3. The method of claim 1 wherein performing continuous over-the-air supervision of the MIMO transceiver of the radio system comprises performing continuous over-the-air supervision of one or more factors that impact beam directivity and/or beam shape of the MIMO transceiver of the radio system.

4. The method of claim 1 wherein performing continuous over-the-air based supervision of the MIMO transceiver of the radio system comprises performing continuous non-network-assisted over-the-air based supervision of the MIMO transceiver of the radio system.

5. The method of claim 4 wherein:
   performing continuous non-network-assisted over-the-air based supervision of the MIMO transceiver of the radio system comprises obtaining received power measurements for signals received from two or more wireless devices mounted to a fixed or mobile test structure while the MIMO transceiver is configured to receive on a receive beam directed at a first wireless device of the two or more wireless devices; and
   determining the status of the MIMO transceiver comprises determining the status of the MIMO transceiver with respect to the receive beam based on a comparison of the received power measurement for the signal received from the first wireless device and the received power measurement for the signal received from each other wireless device of the two or more wireless devices.

6. The method of claim 5 wherein determining the status of the MIMO transceiver with respect to the receive beam based on the comparison of the received power measurement for the signal received from the first wireless device and the received power measurement for the signal received from each other wireless device of the two or more wireless devices comprises:
 determining that the received power measurement for the signal received from the first wireless device is greater than the received power measurement for the signal received from each other wireless device of the two or more wireless devices by at least a predefined threshold amount; and
 determining that the status of the MIMO transceiver with respect to the receive beam is healthy upon determining that the received power measurement for the signal received from the first wireless device is greater than the received power measurement for the signal received from each other wireless device of the two or more wireless devices by at least the predefined threshold amount.

7. The method of claim 5 wherein determining the status of the MIMO transceiver with respect to the receive beam based on the comparison of the received power measurement for the signal received from the first wireless device and the received power measurement for the signal received from each other wireless device of the two or more wireless devices comprises:
 determining that the received power measurement for the signal received from the first wireless device is not greater than the received power measurement for the signal received from each other wireless device of the two or more wireless devices by at least a predefined threshold amount; and
 determining that the status of the MIMO transceiver with respect to the receive beam is non-healthy upon determining that the received power measurement for the signal received from the first wireless device is not greater than the received power measurement for the signal received from each other wireless device of the two or more wireless devices by at least the predefined threshold amount.

8. The method of claim 5 wherein the two or more wireless devices transmit the signals at a same transmit power.

9. The method of claim 5 wherein the two or more wireless devices transmit the signals at different transmit powers, and the received power measurements are normalized with respect to transmit power.

10. The method of claim 2 wherein:
 performing continuous over-the-air based supervision of the MIMO transceiver of the radio system comprises transmitting a signal to a first wireless device of two or more wireless devices mounted to a fixed or mobile test structure while the MIMO transceiver is configured to transmit on a transmit beam directed at the first wireless device of the two or more wireless devices; and
 determining the status of the MIMO transceiver comprises:
 obtaining a received power for the signal at each of the two or more wireless devices; and
 determining the status of the MIMO transceiver with respect to the transmit beam based on a comparison of the received power for the signal at the first wireless device and the received power for the signal at each other wireless device of the two or more wireless devices.

11. The method of claim 10 wherein determining the status of the MIMO transceiver with respect to the transmit beam based on the comparison of the received power for the signal received at the first wireless device and the received power for the signal received at each other wireless device of the two or more wireless devices comprises:
 determining that the received power for the signal at the first wireless device is greater than the received power for the signal at each other wireless device of the two or more wireless devices by at least a predefined threshold amount; and
 determining that the status of the MIMO transceiver with respect to the transmit beam is healthy upon determining that the received power for the signal at the first wireless device is greater than the received power for the signal at each other wireless device of the two or more wireless devices by at least the predefined threshold amount.

12. The method of claim 10 wherein determining the status of the MIMO transceiver with respect to the transmit beam based on the comparison of the received power for the signal at the first wireless device and the received power for the signal at each other wireless device of the two or more wireless devices comprises:
 determining that the received power for the signal at the first wireless device is not greater than the received power for the signal at each other wireless device of the two or more wireless devices by at least a predefined threshold amount; and
 determining that the status of the MIMO transceiver with respect to the transmit beam is non-healthy upon determining that the received power for the signal at the first wireless device is not greater than the received power for the signal at each other wireless device of the two or more wireless devices by at least the predefined threshold amount.

13. The method claim 4 wherein:
 performing continuous non-network-assisted over-the-air based supervision of the MIMO transceiver of the radio system comprises obtaining a received power measurement for a signal received from a wireless device located at a cell edge between a first cell served by the radio system and one or more additional cells served by one or more additional radio access nodes; and
 determining status of the MIMO transceiver comprises determining the status of the MIMO transceiver based on:
 a comparison of the received power measurement for the signal received from the wireless device to a reference value; and
 information that is related to a received power for a signal from the wireless device received at the one or more additional radio access nodes.

14. The method of claim 13 wherein determining the status of the MIMO transceiver comprises determining that the status of the MIMO transceiver is healthy if the received power measurement for the signal received from the wireless device is within a predefined range of the reference value.

15. The method of claim 14 wherein determining the status of the MIMO transceiver comprises determining that the status of the MIMO transceiver is unhealthy if:
 the received power measurement for the signal received from the wireless device is not within the predefined range of the reference value; and
 the information that is related to the received power for the signal from the wireless device received at the one or more additional radio access nodes indicates that the received power for the signal from the wireless device received at the one or more additional radio access nodes is within a predefined range relative to respective reference values.

16. The method of claim 1 wherein performing continuous over-the-air based supervision of the MIMO transceiver of the radio system comprises performing continuous network-assisted over-the-air based supervision of the MIMO transceiver of the radio system.

17. The method of claim 16 wherein performing continuous network-assisted over-the-air based supervision of beam directivity and/or beam shape of the MIMO transceiver of the radio system comprises:
   transmitting a test signal to a neighboring radio access node using one or more transmit beams in a direction of the neighboring radio access node; and
   receiving, from the neighboring radio access node, an indication of whether the neighboring radio access node detected an impairment to the one or more transmit beams in the direction of the neighboring radio access node.

18. The method of claim 17 wherein performing continuous network-assisted over-the-air based supervision of beam directivity and/or beam shape of the MIMO transceiver of the radio system further comprises:
   upon determining that there is an impairment to the one or more transmit beams based on the indication received from the neighboring radio access node, for each additional neighboring radio access node of at least one additional neighboring radio access node:
      transmitting a second test signal to the additional neighboring radio access node using one or more transmit beams in a direction of the additional neighboring radio access node; and
      receiving, from the additional neighboring radio access node, an indication of whether the additional neighboring radio access node detected an impairment to the one or more transmit beams in the direction of the additional neighboring radio access node.

19. The method of claim 18 wherein:
   determining the status of the MIMO transceiver comprises determining that there is an error in the MIMO transceiver based on the indications received from the neighboring radio access node and the at least one additional neighboring radio access node; and
   taking the action based on the status of the MIMO transceiver comprises initiating one or more actions to address the error.

20. A radio system implementing a radio access node, comprising:
   a Multiple Input Multiple Output, MIMO, transceiver; and
   processing circuitry configured to:
      perform continuous over-the-air based supervision of the MIMO transceiver of the radio system;
      determine a status of the MIMO transceiver based on results of performing the continuous over-the-air based supervision of the MIMO transceiver of the radio system; and
      take an action based on the status of the MIMO transceiver;
   wherein being configured to perform continuous over-the-air supervision of the MIMO transceiver of the radio system comprises one of the group consisting of being configured to:
      perform continuous over-the-air supervision of beam directivity and/or beam shape of the MIMO transceiver of the radio system;
      perform continuous over-the-air supervision of one or more factors that impact beam directivity and/or beam shape of the MIMO transceiver of the radio system;
      perform continuous non-network-assisted over-the-air based supervision of the MIMO transceiver of the radio system; and
      perform continuous network-assisted over-the-air based supervision of the MIMO transceiver of the radio system.

* * * * *